US012485125B2

(12) United States Patent
Matzouranis et al.

(10) Patent No.: US 12,485,125 B2
(45) Date of Patent: Dec. 2, 2025

(54) TREATMENT WITH P2X3 MODULATORS

(71) Applicant: GlaxoSmithKline Intellectual Property (No. 3) Limited, Stevenage (GB)

(72) Inventors: Antonios Matzouranis, Laval (CA); Denis Garceau, Laval (CA); Roberto Bellini, Laval (CA)

(73) Assignee: GlaxoSmithKline Intellectual Property (No. 3) Limited, Stevenage (GB)

(*) Notice: Subject to any disclaimer, the term of this patent is extended or adjusted under 35 U.S.C. 154(b) by 931 days.

(21) Appl. No.: 17/461,988

(22) Filed: Aug. 30, 2021

(65) Prior Publication Data

US 2021/0386751 A1   Dec. 16, 2021

Related U.S. Application Data

(63) Continuation of application No. PCT/IB2020/000160, filed on Feb. 24, 2020.

(60) Provisional application No. 62/810,163, filed on Feb. 25, 2019.

(51) Int. Cl.
| | |
|---|---|
| *A61K 31/5377* | (2006.01) |
| *A61K 31/437* | (2006.01) |
| *A61K 31/4545* | (2006.01) |
| *A61K 45/06* | (2006.01) |
| *A61P 15/00* | (2006.01) |
| *A61P 25/04* | (2006.01) |

(52) U.S. Cl.
CPC ........ *A61K 31/5377* (2013.01); *A61K 31/437* (2013.01); *A61K 31/4545* (2013.01); *A61K 45/06* (2013.01); *A61P 15/00* (2018.01); *A61P 25/04* (2018.01)

(58) Field of Classification Search
CPC .............. A61K 31/5377; A61K 31/437; A61K 31/4545; A61K 45/06; A61P 25/04; A61P 15/00
See application file for complete search history.

(56) References Cited

U.S. PATENT DOCUMENTS

| | | |
|---|---|---|
| 7,550,495 B2 | 6/2009 | Page et al. |
| 8,530,467 B2 | 9/2013 | Cantin et al. |
| 9,598,409 B2 | 3/2017 | Buon et al. |
| 9,814,725 B2 * | 11/2017 | Buon ............... A61P 11/00 |
| 9,937,815 B2 | 4/2018 | Smidebrant et al. |
| 10,111,883 B1 | 10/2018 | Garceau et al. |
| 2006/0264490 A1 | 11/2006 | Page et al. |
| 2015/0290181 A1 | 10/2015 | Lee et al. |
| 2015/0361078 A1 | 12/2015 | Buon et al. |
| 2017/0143730 A1 | 5/2017 | Buon et al. |
| 2017/0326141 A1 | 11/2017 | Trower |
| 2018/0015099 A1 | 1/2018 | Buon et al. |
| 2019/0300957 A1 | 10/2019 | Gonsky et al. |
| 2020/0390779 A1 | 12/2020 | Buon et al. |
| 2021/0228588 A1 | 7/2021 | Buon et al. |
| 2021/0322432 A1 | 10/2021 | Garceau et al. |

FOREIGN PATENT DOCUMENTS

| | | |
|---|---|---|
| CA | 921395 A | 2/1973 |
| CA | 2655780 A1 | 12/2007 |
| CA | 2777746 A1 | 5/2011 |
| CA | 2898665 A1 | 8/2014 |
| CA | 2921395 A1 | 2/2015 |
| CA | 2998742 A1 | 4/2017 |
| CN | 102741245 A | 10/2012 |
| EP | 0533266 A1 | 3/1993 |
| EP | 2501697 A1 | 9/2012 |
| JP | 2004002826 A | 1/2004 |
| RU | 2294935 C2 | 3/2007 |
| WO | WO-9722596 A1 | 6/1997 |
| WO | WO-9730035 A1 | 8/1997 |
| WO | WO-9732856 A1 | 9/1997 |
| WO | WO-9813354 A1 | 4/1998 |
| WO | WO-9902166 A1 | 1/1999 |
| WO | WO-0040529 A1 | 7/2000 |
| WO | WO-0041669 A2 | 7/2000 |
| WO | WO-0047212 A1 | 8/2000 |
| WO | WO-0192224 A1 | 12/2001 |
| WO | WO-0194341 A1 | 12/2001 |
| WO | WO-0204434 A1 | 1/2002 |
| WO | WO-0208213 A1 | 1/2002 |
| WO | WO-02085309 A2 | 10/2002 |
| WO | WO-2006119504 A2 | 11/2006 |
| WO | WO-2007147478 A1 | 12/2007 |
| WO | WO-2008136756 A1 | 11/2008 |
| WO | WO-2010033168 A2 | 3/2010 |
| WO | WO-2011062550 A1 | 5/2011 |
| WO | WO-2014117274 A1 * | 8/2014 ......... A61K 31/4025 |
| WO | WO-2016091776 A1 | 6/2016 |
| WO | WO-2017160569 A1 | 9/2017 |
| WO | WO-2018064135 A1 | 4/2018 |

(Continued)

OTHER PUBLICATIONS

Ding et al. (PLoS One. 2017 12(9): e0184647) (Year: 2017).*
Coutureau et al. Insights Imaging. 2023; 14 (94) (Year: 2023).*
Abdulqawi et al. P2X3 receptor antagonist (AF-219) in refractory chronic cough: a randomised, double-blind, placebo-controlled phase 2 study. Lance 385(9974):1198-1205 (2015).
Australian Patent Application No. 2014211962 Examination Report No. 2 dated Jun. 12, 2017.
Australian Patent Application No. 2014211962 Examination Report No. 3 dated Sep. 29, 2017.
Baviskar et al.: N-fused imidazoles as novel anticancer agents that inhibit catalytic activity of topoisomerase IIα and induce apoptosis in G1/S phase. J Med Chem. 54(14):5013-5030 (2011).
Berge et al.: Pharmaceutical Salts. Journal of Pharmaceutical. 66:1-19 (1997).

(Continued)

*Primary Examiner* — Clinton A Brooks
*Assistant Examiner* — Jerica Katlynn Wilson
(74) *Attorney, Agent, or Firm* — William B. Stauffer

(57) ABSTRACT

Provided herein are methods for treating endometriosis, endometriosis-associated pain, and endometriosis-associated symptoms in a mammal in need thereof with a P2X3 modulator.

19 Claims, 2 Drawing Sheets

(56) References Cited

FOREIGN PATENT DOCUMENTS

| WO | WO-2019064079 A2 | 4/2019 |
|---|---|---|
| WO | WO-2020099923 A1 | 5/2020 |
| WO | WO-2020112890 A1 | 6/2020 |
| WO | WO-2020135771 A1 | 7/2020 |
| WO | WO-2020174283 A1 | 9/2020 |
| WO | WO-2021161105 A1 | 8/2021 |
| WO | WO-2021161109 A1 | 8/2021 |

OTHER PUBLICATIONS

Byrn et al.: Pharmaceutical Solids: A Strategic Approach to Regulatory Considerations. Pharmaceutical Research. vol. 12, No. 7, 945-954 (1995).

Canadian Patent Application No. 2,898,665 Office Action dated Nov. 26, 2019.

Cantin et al.: Discovery of P2X3 Selective Antagonists for the Treatment of Chronic Pain. Bioorganic & Medicinal Chemistry Letters, 22(7):2565-2571, 2012.

Chauret et al.: BLU-5937, A potent and selective P2X3 antagonist, for the treatment of chronic itch: evidence from pre-clinical studies. Journal of Investigative Dermatology 139(9S):S232 (2019).

Chen et al.: A P2X purinoceptor expressed by a subset of sensory neurons. Nature, 377(6548):428-431, 1995.

Chernyak and Gevorgyan: "General and Efficient Copper-Catalyzed Three-Component Coupling Reaction towards Imidazoheterocycles. One-Pot Synthesis of Alpidem and Zolpidem," Angewandte Chemie International Edition, 49(15):2743-2746, 2010.

Chinese Patent Application No. 201710680673.x Search Report and Office Action dated Nov. 28, 2019.

Cockayne et al.: Urinary bladder hyporeflexia and reduced pain-related behaviour in P2X 3-deficient mice. Nature, 407(6807):1011-1015, 2000.

Deady. Ring nitrogen oxidation of amino substituted nitrogen heterocycles with m-Chloroperbenzoic acid. Syn. Comm., 7(8):509-514, 1977.

Ding et al.: P2X3 receptor involvement in endometriosis pain via ERK signaling pathway; Plos One 12(9) pp. 1-17 (2017).

EP18860273.4 Extended European Search Report dated Apr. 23, 2021.

European Patent Application No. 18158586.0 Office Action dated Mar. 26, 2020.

Fabbretti. ATP-gated P2X3 receptors are specialised sensors of the extracellular environment. Advances in Experimental Medicine and Biology 1051:7-16 (2017).

Ford et al.: The therapeutic promise of ATP antagonism at P2X3 receptors in respiratory and urological disorders. Frontiers in Cellular Neuroscience 7:267 [1-10] (2013).

Ford. In pursuit of P2X3 antagonists: novel therapeutics for chronic pain and afferent sensitization. Purinergic Signalling 8(Suppl 1):3-26 (2012).

Garceau et al.: BLU-5937: A selective P2X3 antagonist with potent anti-tussive effect and no taste alteration. Pulmonary Pharmacology and Therapeutics 56:56-62 (2019).

Garcia-Guzman et al.: Molecular characterization and pharmacological properties of the human P2X3 purinoceptor. Mol. Brain Res., 47(1-2):59-66, 1997.

Han et al.: A subpopulation of nociceptors specifically linked to itch. Nat Neurosci. Feb. 2013; 16(2):174-82. doi: 10.1038/nn.3289. Epub Dec. 23, 2012.

Japanese Patent Application No. 2015-555508 first Office Action dated Dec. 12, 2017.

Japanese Patent Application No. 2015-555508 Office Action dated Apr. 24, 2018.

Joule et al.: Heterocyclic Chemistry, Third edition, Chapter 11, "The diazines: pyridazine, pyrimidine and pyrazine: reactions and synthesis." London: Cheapman and Hall, p. 189-225, 1995.

Kamei et al.: Involvement of ionotropic purinergic receptors in the histamine-induced enhancement of the cough reflex sensitivity in guinea pigs. Eur J Pharmacol 547:160-164, 2006.

Kamei et al.: Involvement of P2X receptor subtypes in ATP-induced enhancement of the cough reflex sensitivity. Eur J Pharmacol 528:158-161, 2005.

Korean Patent Application No. 10-2015-7023171 Office Action dated Jan. 21, 2020.

Korean Patent Application No. 10-2015-7023171 Office Action dated Mar. 25, 2020.

Kwong et al.: P2X2 receptors differentiate placodal vs. neural crest C-fiber phenotypes innervating guinea pig lungs and esophagus. AJP Lung Cell Mol Physiol., 295:L858-L865, 2008.

Lewis et al.: Coexpression of P2X2 and P2X3 receptor subunits can account for ATP-gated currents in sensory neurons. Nature, 377(6548):432-435, 1995.

Lombardo et al.: Discovery of N-(2-Chloro-6-methyl-phenyl)-2-(6-(4-(2-hydroxyethyl)-piperazin-1-yl)-2-methylpyrimidin-4-ylamino)thiazole-5-carboxamide (BMS-354825), a Dual Src/Abl kinase inhibitor with potent antitumor activity in preclinical assays. J. Med. Chem., 47:6658-6661, 2004.

Mackenzie et al.: Drug Discovery Today: Disease Models, 1(3):297-302, 2004.

Marucci et al., Update on novel purinergic P2X3 and P2X2/3 receptor antagonists and their potential therapeutic applications. Expert Opinion on Therapeutic Patents 29(12):943-963 (2019).

North. The P2X3 subunit: a molecular target in pain therapeutics. Current Opinion in Investigational Drugs 4(7):833-840 (2003).

PCT/CA2014/050062 International Preliminary Report on Patentability dated Aug. 4, 2015.

PCT/CA2014/050062 International Search Report and Written Opinion dated Apr. 29, 2014.

PCT/IB2018/001513 International Preliminary Report on Patentability dated Apr. 2, 2020.

PCT/IB2018/001513 International Search Report and Written Opinion dated Apr. 2, 2019.

PCT/IB2019/001122 International Preliminary Report on Patentability dated Apr. 22, 2021.

PCT/IB2019/001122 International Search Report and Written Opinion dated Feb. 10, 2020.

PCT/IB2019/001199 International Preliminary Report on Patentability dated May 27, 2021.

PCT/IB2019/001199 International Search Report and Written Opinion dated Mar. 3, 2020.

PCT/IB2020/000160 International Preliminary Report on Patentability dated Sep. 2, 2021.

PCT/IB2020/000160 International Search Report and Written Opinion dated Jun. 15, 2020.

PCT/IB2021/000091 International Search Report and Written Opinion dated May 25, 2021.

PCT/IB2021/000130 International Search Report and Written Opinion dated Jun. 14, 2021.

Russian Patent Application No. 2015133450 Office Action and Search Report dated Dec. 20, 2017.

Shiratori-Hayashi et al.: Role of P2X3 receptors in scratching behavior in mouse models. Journal of Allergy and Clinical Immunology 143(3):1252-1254 (2019).

Silverman et al.: Chapter 8: Prodrugs and drug delivery systems. In: The Organic Chemistry of Drug Design and Drug Action. San Diego: Academic Press, Inc. p. 352-401 (1992).

Trower et al.: Neurokinin-1 receptor antagonist orvepitant is an effective inhibitor of itch-associated response in a Mongolian gerbil model of scratching behaviour. Experimental Dermatology 23(11):858-860 (2014).

Ugo Basile 2012 Catalog; https://analab.gr/wp-content/uploads/Ugo-Basile-Catalogue-2012.pdf XP055483468 (2012).

U.S. Appl. No. 16/375,773 Office Action dated Jul. 9, 2019.

Vilotti et al.: B-Type Natriuretic Peptide-Induced Delayed Modulation of TRPV1 and P2X3 Receptors of Mouse Trigeminal Sensory Neurons. PLoS One. 8(11):e81138 (2013).

Yuan et al.: Effect of A-3177491 delivered by glycolipid-like polymer micelles on endometriosis pain. Int. J. Nanomedicine. 12:8171-8183 (2017).

(56) References Cited

OTHER PUBLICATIONS

Zhong et al.: Bladder and cutaneous sensory neurons of the rat express different functional P2X receptors. Neuroscience, 120(3):667-675, 2003.

Krina T Zondervan, et al.; "Endometriosis", Nat Rev Dis Primers, Jul. 19, 2018;4(1):9. doi: 10.1038/s41572-018-0008-5.

Geoffroy Laumet, et al.; "CD3+ T cells are critical for the resolution of comorbid inflammatory pain and depression-like behavior", Neurobiol Pain. Jan. 21, 2020;7:100043. doi: 10.1016/j.ynpai.2020.100043.

Miguel A Tejada, et al.; "Rodent Animal Models of Endometriosis-Associated Pain: Unmet Needs and Resources Available for Improving Translational Research in Endometriosis", Int J Mol Sci Jan. 26, 2023;24(3):2422. doi: 10.3390/ijms24032422.

J Curtis Nickel, et al.; "Tanezumab Reduces Pain in Women with Interstitial Cystitis/Bladder Pain Syndrome and Patients with Nonurological Associated Somatic Syndromes", J Urol Apr. 2016;195(4 Pt 1):942-8. doi: 10.1016/j.juro.2015.10.178. Epub Nov. 11, 2015.

\* cited by examiner

TREATMENT WITH P2X3 MODULATORS

CROSS-REFERENCE

This application is a Continuation Application of International Application PCT/IB2020/000160, filed on Feb. 24, 2020, which claims the benefit of U.S. Provisional Application No. 62/810,163, filed on Feb. 25, 2019, which is herein incorporated by reference in its entirety.

BACKGROUND

Endometriosis is a common gynecological disease in which endometrial tissue grows outside the uterus, often in the pelvic area. Endometriosis lacks effective treatment options as current therapy often results in endometriosis pain recurrence and side effects. Thus, new therapeutic agents are needed to treat endometriosis.

BRIEF SUMMARY OF THE INVENTION

This disclosure provides, for example, methods of treating endometriosis in a mammal with a P2X3 modulator. The disclosure also provides for the use of P2X3 modulators as medicaments and/or in the manufacture of medicaments for treating endometriosis in mammals, such as humans. In some embodiments, the P2X3 modulator is a P2X3 antagonist.

In one aspect is a method of treating endometriosis, endometriosis-associated pain, and endometriosis-associated symptoms in a mammal in need thereof, the method comprising administering to the mammal a therapeutically effective amount of a P2X3 antagonist. In some embodiments is a method of treating endometriosis in a mammal in need thereof, the method comprising administering to the mammal a therapeutically effective amount of a P2X3 antagonist. In some embodiments is a method of treating endometriosis-associated pain in a mammal in need thereof, the method comprising administering to the mammal a therapeutically effective amount of a P2X3 antagonist. In some embodiments is a method of treating endometriosis-associated symptoms in a mammal in need thereof, the method comprising administering to the mammal a therapeutically effective amount of a P2X3 antagonist. In some embodiments is a method of treating endometriosis-associated symptoms in a mammal in need thereof, the method comprising administering to the mammal a therapeutically effective amount of a P2X3 antagonist, wherein said symptoms are selected from dysmenorrhea, dyspareunia, dysuria, and dyschezia.

In some embodiments is a method of treating endometriosis, endometriosis-associated pain, and endometriosis-associated symptoms in a mammal in need thereof, comprising administering to the mammal a therapeutically effective amount of a P2X3 antagonist, wherein the P2X3 antagonist is a compound of Formula (I), or a pharmaceutically acceptable salt thereof:

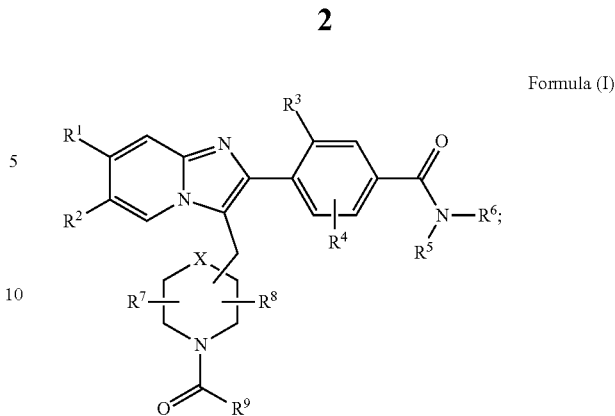

Formula (I)

wherein:
$R^1$ is selected from the group consisting of cyano, halogen, methyl, and ethyl;
$R^2$ is selected from the group consisting of hydrogen, halogen, methyl, and ethyl;
$R^3$ is selected from the group consisting of halogen, methyl, and ethyl;
$R^4$ is selected from the group consisting of hydrogen, halogen, methyl, ethyl, and methoxy;
$R^5$ and $R^6$ are independently selected from the group consisting of hydrogen, $C_1$-$C_6$-alkyl, and hydroxy-$C_1$-$C_6$-alkyl; or
$R^5$ and $R^6$, together with the nitrogen to which they are both attached, form a 5- or 6-member heterocycloalkyl, wherein the heterocycloalkyl is optionally substituted with one or more substituents independently selected from the group consisting of halogen, hydroxyl, and $C_1$-$C_4$-alkyl;
$R^7$ and $R^8$ are independently selected from the group consisting of hydrogen and $C_1$-$C_4$-alkyl;
$R^9$ is selected from the group consisting of $C_1$-$C_6$-alkyl, $C_3$-$C_6$-cycloalkyl, $C_1$-$C_6$-alkyl-$C_3$-$C_6$-cycloalkyl, halo-$C_1$-$C_6$-alkyl, $C_1$-$C_6$-alkoxy, halo-$C_1$-$C_6$-alkoxy, and $C_1$-$C_6$-alkoxy-$C_1$-$C_6$-alkyl; and
X is selected from the group consisting of a bond, $CH_2$, and O.

In some embodiments, $R^1$ is methyl. In some embodiments, $R^2$ is hydrogen. In some embodiments, $R^3$ is fluoro. In some embodiments, X is O. In some embodiments, the compound of Formula (I) corresponds in structure to

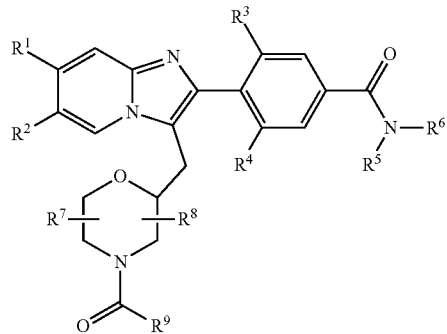

and $R^4$ is selected from the group consisting of halogen, methyl, and ethyl. In some embodiments, $R^5$ is hydrogen. In some embodiments, $R^6$ is $C_1$-$C_6$-alkyl. In some embodiments, $R^6$ is methyl. In some embodiments, $R^7$ is hydrogen. In some embodiments, $R^8$ is hydrogen. In some embodiments, $R^9$ is $C_1$-$C_6$-alkoxy. In some embodiments, $R^9$ is methoxy. In some embodiments, the compound of Formula (I) corresponds in structure to
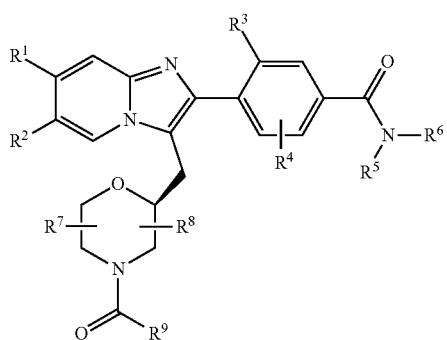
In some embodiments, the compound of Formula (I) corresponds in structure to:
Compound 1
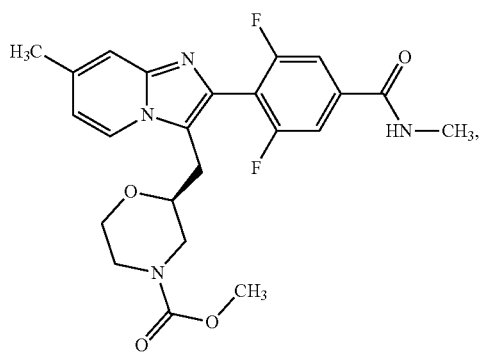
Compound 2
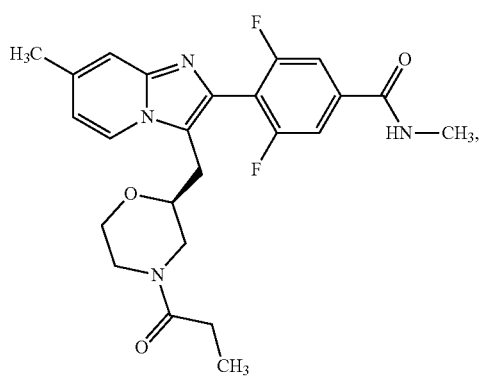
Compound 3
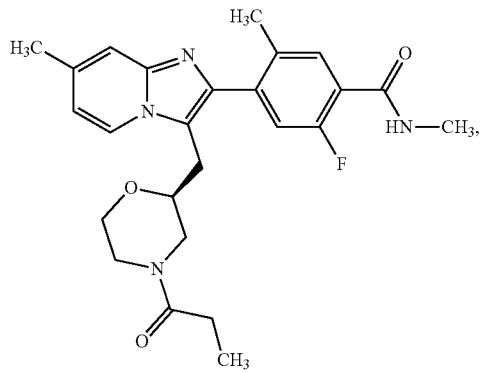
Compound 4
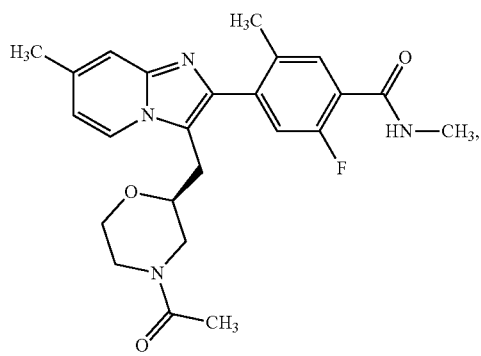
Compound 5
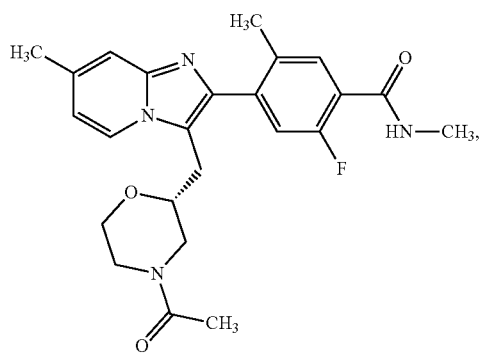
Compound 6
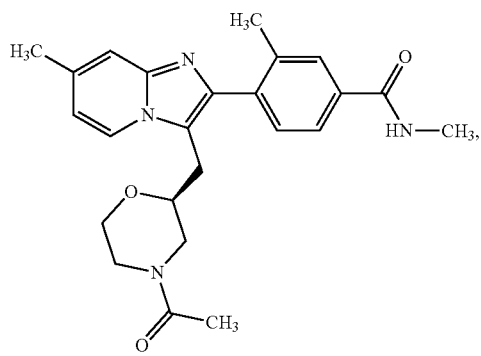

-continued
Compound 7
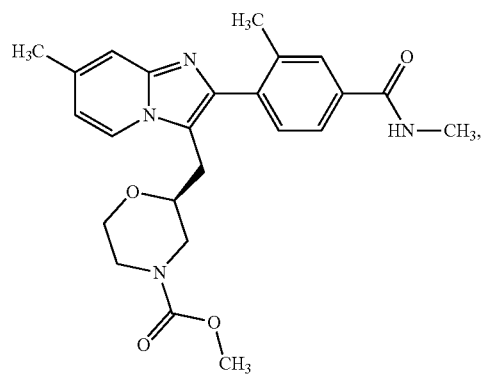
Compound 8
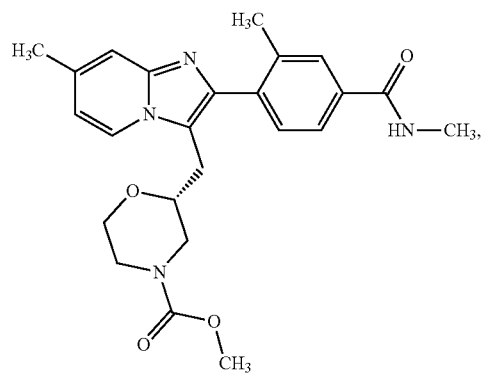
Compound 9
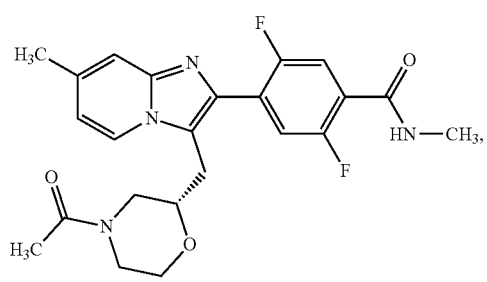
Compound 10
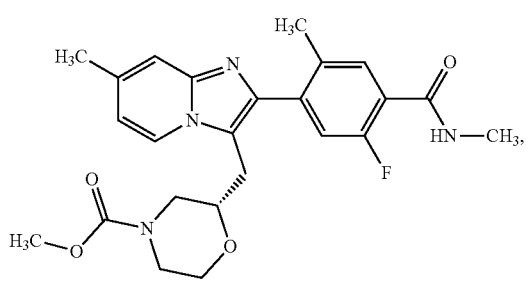
-continued
Compound 11
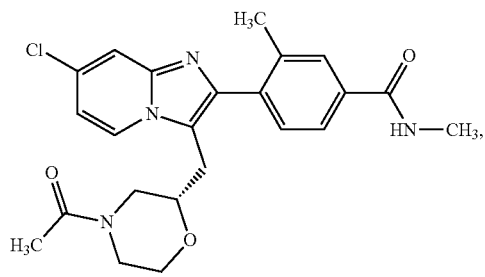
Compound 12
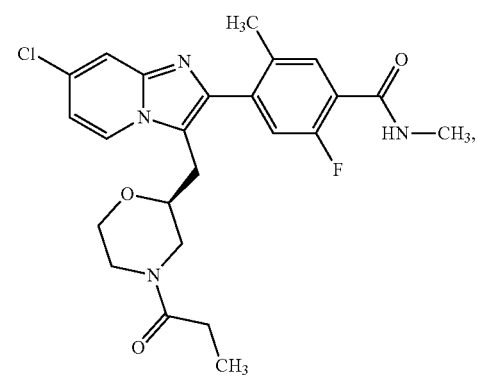
Compound 13
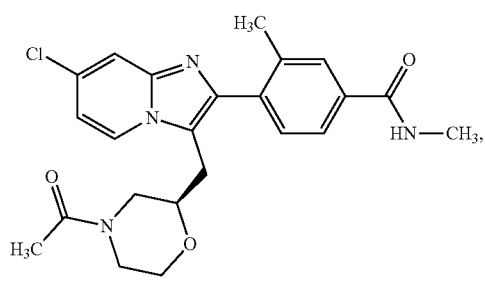
Compound 14
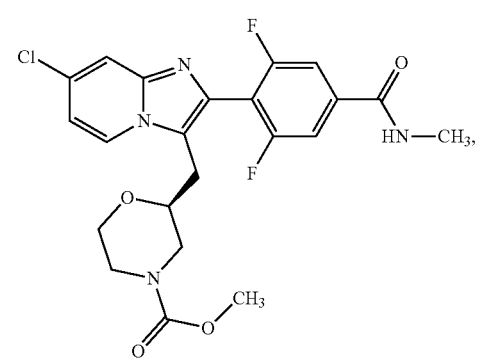

Compound 15

Compound 16

Compound 17

Compound 18

Compound 19

Compound 20

Compound 21

Compound 22

Compound 23
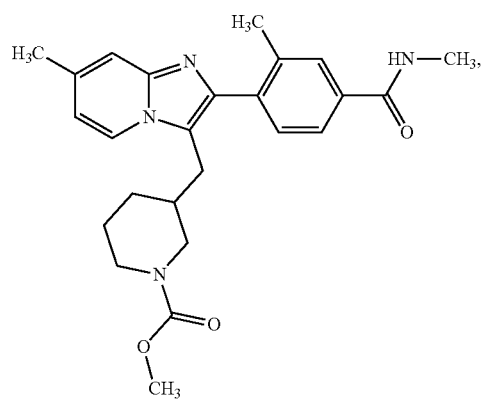
Compound 24
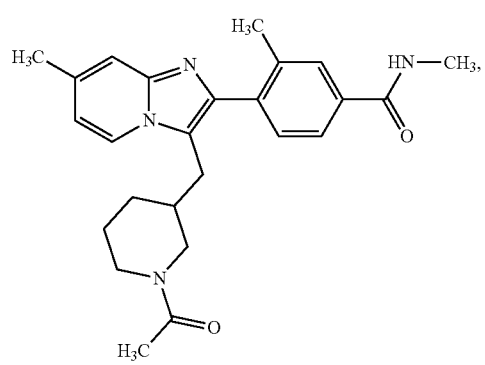
Compound 25
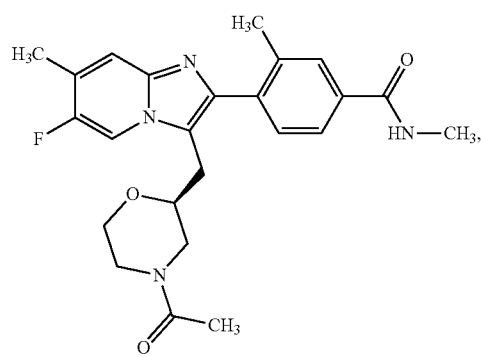
Compound 26
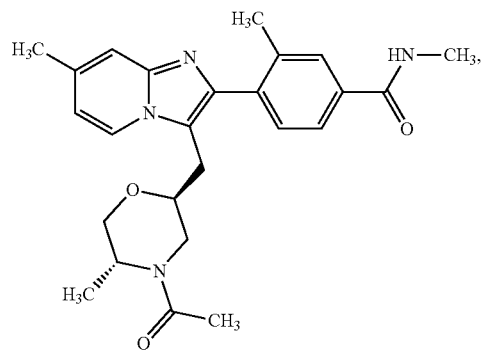
Compound 27
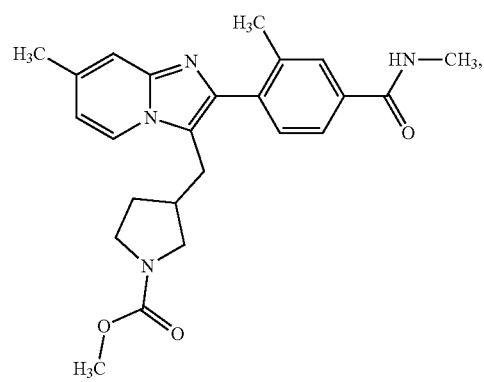
Compound 28
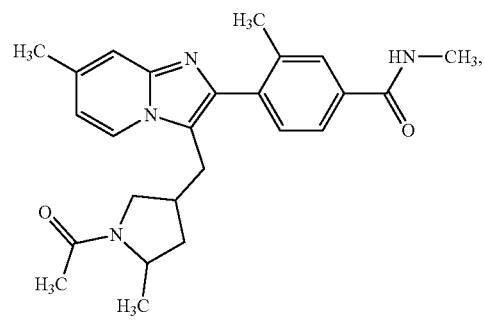
Compound 29
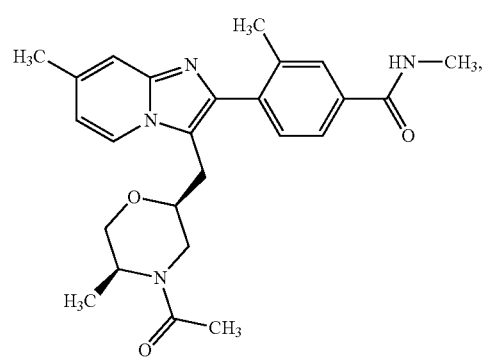
Compound 30
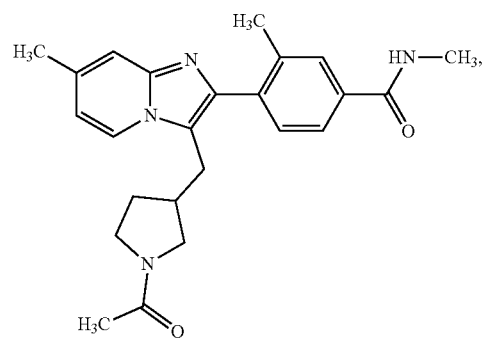

-continued

Compound 31

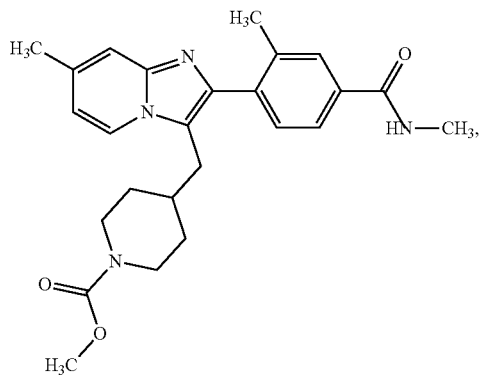

Compound 32

Compound 33

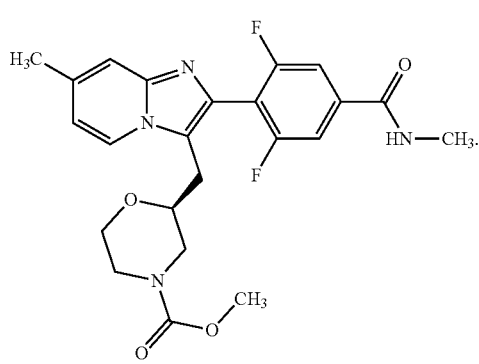

In some embodiments, the compound of Formula (I) corresponds in structure to:

Compound 1

In some embodiments, the compound of Formula (I) corresponds in structure to:

Compound 20

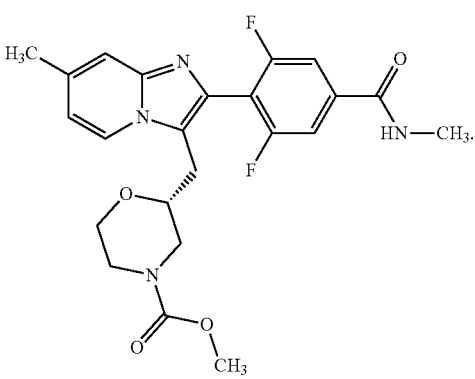

In some embodiments, the compound of Formula (I) corresponds in structure to:

Compound 2

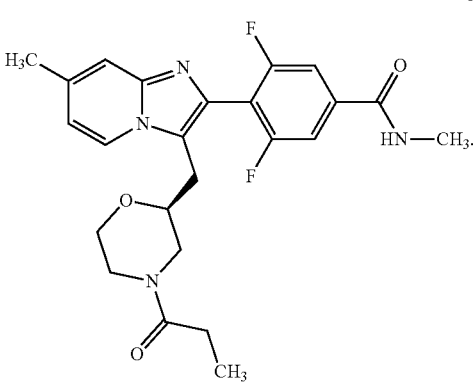

In some embodiments, the compound of Formula (I) corresponds in structure to

Compound 21

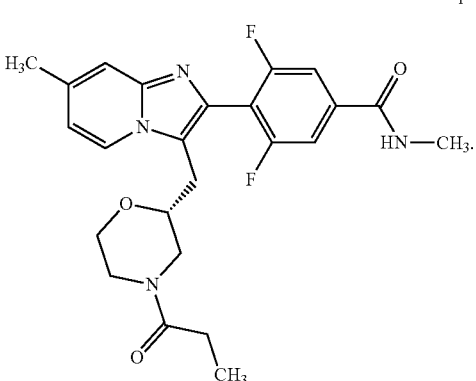

In some embodiments, the P2X3 antagonist corresponds in structure to:

Compound 34

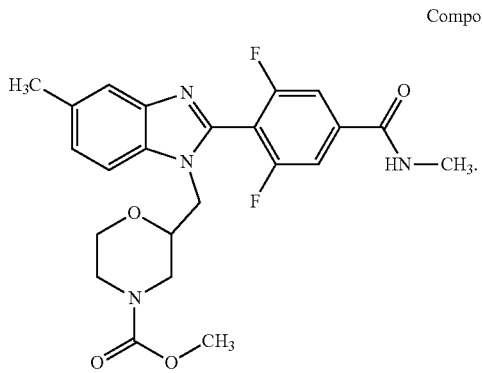

In some embodiments, the P2X3 antagonist corresponds in structure to:

Compound 35

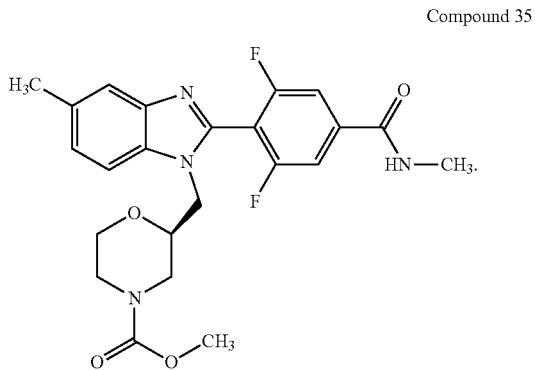 [SMILES: CNC(=O)c1cc(F)c(-c2nc3cc(C)ccc3n2C[C@H]2CN(C(=O)OC)CCO2)c(F)c1]

In some embodiments, the P2X3 antagonist corresponds in structure to:

Compound 36

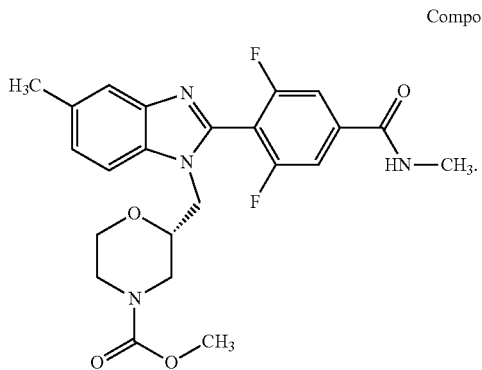

In some embodiments is a method of treating endometriosis, endometriosis-associated pain, and endometriosis-associated symptoms in a mammal in need thereof, the method comprising administering to the mammal a therapeutically effective amount of a P2X3 antagonist, wherein the mammal is human. In some embodiments is a method of treating endometriosis in a mammal in need thereof, the method comprising administering to the mammal a therapeutically effective amount of a P2X3 antagonist of Formula (I) described herein. In some embodiments is a method of treating endometriosis-associated pain in a mammal in need thereof, the method comprising administering to the mammal a therapeutically effective amount of a P2X3 antagonist of Formula (I) described herein. In some embodiments is a method of treating endometriosis-associated symptoms in a mammal in need thereof, the method comprising administering to the mammal a therapeutically effective amount of a P2X3 antagonist of Formula (I) described herein. In some embodiments is a method of treating endometriosis-associated symptoms in a mammal in need thereof, the method comprising administering to the mammal a therapeutically effective amount of a P2X3 antagonist of Formula (I) described herein, wherein the endometriosis-associated symptoms are selected from dysmenorrhea, dyspareunia, dysuria, and dyschezia. In some embodiments is a method of treating endometriosis, endometriosis-associated pain, and endometriosis-associated symptoms in a mammal in need thereof with a P2X3 antagonist of Formula (I) described herein, wherein the P2X3 antagonist is formulated for administration to a mammal by intravenous administration, subcutaneous administration, oral administration, inhalation, nasal administration, topical administration, or ophthalmic administration. In some embodiments is a method of treating endometriosis, endometriosis-associated pain, and endometriosis-associated symptoms in a mammal in need thereof with a P2X3 antagonist of Formula (I) described herein, wherein the P2X3 antagonist is formulated in the form of a tablet, a pill, a capsule, a liquid, a suspension, a gel, a dispersion, a solution, an emulsion, an ointment, or a lotion. In some embodiments is a method of treating endometriosis, endometriosis-associated pain, and endometriosis-associated symptoms in a mammal in need thereof, the method comprising administering to the mammal a therapeutically effective amount of a P2X3 antagonist of Formula (I) described herein, further comprising the administration of a second therapeutic agent. In some embodiments is a method of treating endometriosis, endometriosis-associated pain, and endometriosis-associated symptoms in a mammal in need thereof, the method comprising administering to the mammal a therapeutically effective amount of a P2X3 antagonist of Formula (I) described herein, further comprising the administration of a second therapeutic agent selected from a hormonal contraceptive, a non-steroidal anti-inflammatory agent (NSAID), a prostaglandin E synthase (PTGES) inhibitor, an interleukin-1 receptor-associated kinase 4 (IRAK4) inhibitor, a prostanoid EP4 receptor antagonist, an aldo-keto reductase 1C3 (AKR1C3) inhibitor, and a prolactin receptor (PRLR) antagonist.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Figure 1A:
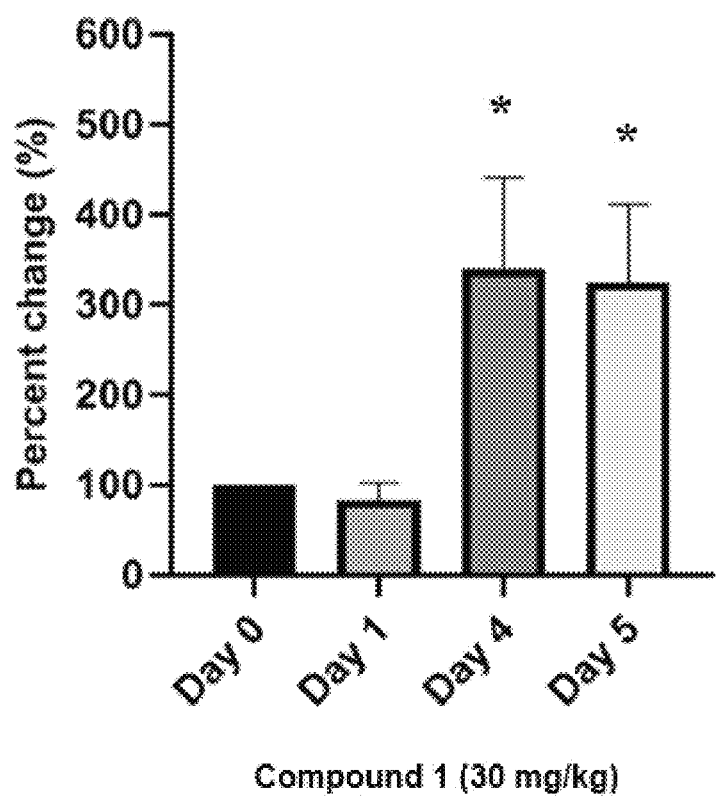
FIG. 1A depicts von Frey filament results in syngeneic C57BL/6 mice dosed with Compound 1 (30 mg/kg, i.p.).

The pain associated with endometriosis is attributed to functional endometriotic lesions, embedded with nerve fibers, on the outside of the uterine cavity. Afferent sensory fibers and pro-inflammatory mediators are correlated with endometriosis-associated pain. In particular, women with endometriosis have elevated levels of pro-inflammatory cytokines, such as interleukin (IL)-1β, IL-6, prostaglandins (PGs), tumor necrosis factor (TNF)-α, and nerve growth factor (NGF) in peritoneal fluid and endometriotic lesions. Inflammatory mediators in the endometriotic peritoneal inflammatory microenvironment activate nociceptive receptors on afferent neurons by stimulating sensory nerve fibers (including C- or Aδ-fibers) innervated within endometriotic lesions, providing the sensitization of sensory neurons and ultimately triggering a pain signal cascade. In some cases, anti-inflammatory agents provide pain relief. However, these agents often provide minimal relief of pain symptoms, and recurrence and serious side-effects can occur (Ding et al., PloS one, 2017, 12(9), 1-17; Yuan et al., Int. J. Nanomed., 2017, 8171-8183).

Afferent neurons found in endometriotic lesions on the outside of the uterine cavity consist of C- or Aδ-fibers of the dorsal root ganglions and form synapses with the spinal cord. C- and Aδ-fiber terminals express receptors that respond to pro-inflammatory mediators to initiate action potentials that are transmitted to the CNS. Important transducers of this signalling pathway expressed by these neurons are P2X3 cation channels. Notably, P2X3 channels are co-expressed on the cell membrane of small- and medium-diameter sensory neurons, which are critical pain transducers of noxious stimuli. Additionally, P2X3 expression in endometriosis endometrium and endometriotic lesions are significantly higher than normal endometrial tissue, and both are positively linked to endometriosis-associated pain. (Han et al., Nat. Neurosci., 2013, 174-182; Vilotti et al., PloS one, 2013, 8(11):e81138; Ding et al., PloS one, 2017, 12(9), 1-17).

P2X3 channels are neuronal excitability regulators that are activated by local release of ATP, a neurotransmitter, and pro-inflammatory cytokines. ATP is well established as an important chemical messenger released in excess by neuronal and non-neuronal cell types in multiple pathological conditions (Burnstock, Front. Pharmacol., 2017, 661; Burnstock, Biochem. Pharmacol., 2017, doi:10.1016/j.bcp.2017.07.016). Accordingly, under pathophysiological conditions, the increased release of ATP modulated by inflammatory mediators can lead to activation of P2X3, leading to hyperexcitability of afferent neurons located in the endometrium outside the uterine cavity and heightened sensitivity to endometriosis-associated pain. Overall, P2X3 channels acting through pathological ATP release may be potentially relevant targets to modulate the sensitivity of afferent neurons coupled to endometriosis-associated pain. Their inhibition offers an approach to alleviate pain resulting from endometriosis and endometriosis-like symptoms (Yuan et al., Int. J. Nanomed., 2017, 8171-8183).

Definitions

As used herein and in the appended claims, the singular forms "a," "an," and "the" include plural referents unless the context clearly dictates otherwise. Thus, for example, reference to "an agent" includes a plurality of such agents, and reference to "the cell" includes reference to one or more cells (or to a plurality of cells) and equivalents thereof. When ranges are used herein for physical properties, such as molecular weight, or chemical properties, such as chemical formulae, all combinations and subcombinations of ranges and specific embodiments therein are intended to be included. The term "about" when referring to a number or a numerical range means that the number or numerical range referred to is an approximation within experimental variability (or within statistical experimental error), and thus the number or numerical range varies between 1% and 15% of the stated number or numerical range. The term "comprising" (and related terms such as "comprise" or "comprises" or "having" or "including") is not intended to exclude that which in other certain embodiments, for example, an embodiment of any composition of matter, composition, method, or process, or the like, described herein, may "consist of" or "consist essentially of" the described features.

As used in the specification and appended claims, unless specified to the contrary, the following terms have the meaning indicated below.

As used herein, $C_1$-$C_x$ includes $C_1$-$C_2$, $C_1$-$C_3$ ... $C_1$-$C_x$. $C_1$-$C_x$ refers to the number of carbon atoms that make up the moiety to which it designates (excluding optional substituents).

"Amino" refers to the —$NH_2$ radical.
"Cyano" refers to the —CN radical.
"Nitro" refers to the —$NO_2$ radical.
"Oxa" refers to the —O— radical.
"Oxo" refers to the =O radical.
"Thioxo" refers to the =S radical.
"Imino" refers to the =N—H radical.
"Oximo" refers to the =N—OH radical.

"Alkyl" or "alkylene" refers to a straight or branched hydrocarbon chain radical consisting solely of carbon and hydrogen atoms, containing no unsaturation, having from one to fifteen carbon atoms (e.g., $C_1$-$C_{15}$ alkyl). In certain embodiments, an alkyl comprises one to thirteen carbon atoms (e.g., $C_1$-$C_{13}$ alkyl). In certain embodiments, an alkyl comprises one to eight carbon atoms (e.g., $C_1$-$C_8$ alkyl). In other embodiments, an alkyl comprises one to six carbon atoms (e.g., $C_1$-$C_6$ alkyl). In other embodiments, an alkyl comprises one to five carbon atoms (e.g., $C_1$-$C_5$ alkyl). In other embodiments, an alkyl comprises one to four carbon atoms (e.g., $C_1$-$C_4$ alkyl). In other embodiments, an alkyl comprises one to three carbon atoms (e.g., $C_1$-$C_3$ alkyl). In other embodiments, an alkyl comprises one to two carbon atoms (e.g., $C_1$-$C_2$ alkyl). In other embodiments, an alkyl comprises one carbon atom (e.g., $C_1$ alkyl). In other embodiments, an alkyl comprises five to fifteen carbon atoms (e.g., $C_5$-$C_{15}$ alkyl). In other embodiments, an alkyl comprises five to eight carbon atoms (e.g., $C_5$-$C_8$ alkyl). In other embodiments, an alkyl comprises two to five carbon atoms (e.g., $C_2$-$C_5$ alkyl). In other embodiments, an alkyl comprises three to five carbon atoms (e.g., $C_3$-$C_5$ alkyl). In other embodiments, the alkyl group is selected from methyl, ethyl, 1-propyl (n-propyl), 1-methylethyl (iso-propyl), 1-butyl (n-butyl), 1-methylpropyl (sec-butyl), 2-methylpropyl (iso-butyl), 1,1-dimethylethyl (tert-butyl), and 1-pentyl (n-pentyl). The alkyl is attached to the rest of the molecule by a single bond. Unless stated otherwise specifically in the specification, an alkyl group is optionally substituted by one or more of the following substituents: halo, cyano, nitro, oxo, thioxo, imino, oximo, trimethylsilanyl, —$OR^a$, —$SR^a$, —$OC(O)R^a$, —$N(R^a)_2$, —$C(O)R^a$, —$C(O)OR^a$, —$C(O)N(R^a)_2$, —$N(R^a)C(O)OR^f$, —OC(O)—$NR^aR^f$, —$N(R^a)C(O)R^f$, —$N(R^a)S(O)_tR^f$ (where t is 1 or 2), —$S(O)_tOR^a$ (where t is 1 or 2), —$S(O)_tR^f$ (where t is 1 or 2) and —$S(O)_tN(R^a)_2$ (where t is 1 or 2) where each $R^a$ is independently hydrogen, alkyl, fluoroalkyl, cycloalkyl, aryl, aralkyl, heterocycloalkyl, heteroaryl or heteroarylalkyl, and each $R^f$ is independently alkyl, fluoroalkyl, cycloalkyl, aryl, aralkyl, heterocycloalkyl, heteroaryl or heteroarylalkyl.

"Alkoxy" refers to a radical bonded through an oxygen atom of the formula —O-alkyl, where alkyl is an alkyl chain as defined above.

"Alkenyl" refers to a straight or branched hydrocarbon chain radical group consisting solely of carbon and hydrogen atoms, containing at least one carbon-carbon double bond, and having from two to twelve carbon atoms. In certain embodiments, an alkenyl comprises two to eight carbon atoms. In other embodiments, an alkenyl comprises two to four carbon atoms. The alkenyl is attached to the rest of the molecule by a single bond, for example, ethenyl (i.e., vinyl), prop-1-enyl (i.e., allyl), but-1-enyl, pent-1-enyl, penta-1,4-dienyl, and the like. Unless stated otherwise specifically in the specification, an alkenyl group is optionally substituted by one or more of the following substituents: halo, cyano, nitro, oxo, thioxo, imino, oximo, trimethylsilanyl, —$OR^a$, —$SR^a$, —OC(O)—$R^f$, —$N(R^a)_2$, —C(O)$R^a$, —C(O)$OR^a$, —C(O)N($R^a$)$_2$, —N($R^a$)C(O)$OR^f$, —OC(O)—$NR^aR^f$, —N($R^a$)C(O)$R^f$, —N($R^a$)S(O)$_tR^f$ (where t is 1 or 2), —S(O)$_tOR^a$ (where t is 1 or 2), —S(O)$_tR^f$ (where t is 1 or 2) and —S(O)$_tN(R^a)_2$ (where t is 1 or 2) where each $R^a$ is independently hydrogen, alkyl, fluoroalkyl, cycloalkyl, aryl, aralkyl, heterocycloalkyl, heteroaryl or heteroarylalkyl, and each $R^f$ is independently alkyl, fluoroalkyl, cycloalkyl, aryl, aralkyl, heterocycloalkyl, heteroaryl or heteroarylalkyl.

"Alkynyl" refers to a straight or branched hydrocarbon chain radical group consisting solely of carbon and hydrogen atoms, containing at least one carbon-carbon triple bond, having from two to twelve carbon atoms. In certain embodiments, an alkynyl comprises two to eight carbon atoms. In other embodiments, an alkynyl has two to four carbon atoms. The alkynyl is attached to the rest of the molecule by a single bond, for example, ethynyl, propynyl, butynyl, pentynyl, hexynyl, and the like. Unless stated otherwise specifically in the specification, an alkynyl group is optionally substituted by one or more of the following substituents: halo, cyano, nitro, oxo, thioxo, imino, oximo, trimethylsilanyl, —$OR^a$, —$SR^a$, —OC(O)$R^a$, —$N(R^a)_2$, —C(O)$R^a$, —C(O)$OR^a$, —C(O)N($R^a$)$_2$, —N($R^a$)C(O)$OR^f$, —OC(O)—$NR^aR^f$, —N($R^a$)C(O)$R^f$, —N($R^a$)S(O)$_tR^f$ (where t is 1 or 2), —S(O)$_tOR^a$ (where t is 1 or 2), —S(O)$_tR^f$ (where t is 1 or 2) and —S(O)$_tN(R^a)_2$ (where t is 1 or 2) where each $R^a$ is independently hydrogen, alkyl, fluoroalkyl, cycloalkyl, aryl, aralkyl, heterocycloalkyl, heteroaryl or heteroarylalkyl, and each $R^f$ is independently alkyl, fluoroalkyl, cycloalkyl, aryl, aralkyl, heterocycloalkyl, heteroaryl or heteroarylalkyl.

"Aryl" refers to a radical derived from an aromatic monocyclic or multicyclic hydrocarbon ring system by removing a hydrogen atom from a ring carbon atom. The aromatic monocyclic or multicyclic hydrocarbon ring system contains only hydrogen and carbon from six to eighteen carbon atoms, where at least one of the rings in the ring system is fully unsaturated, i.e., it contains a cyclic, delocalized (4n+2) π-electron system in accordance with the Hückel theory. The ring system from which aryl groups are derived include, but are not limited to, groups such as benzene, fluorene, indane, indene, tetralin and naphthalene. Unless stated otherwise specifically in the specification, the term "aryl" or the prefix "ar-" (such as in "aralkyl") is meant to include aryl radicals optionally substituted by one or more substituents independently selected from alkyl, alkenyl, alkynyl, halo, fluoroalkyl, cyano, nitro, aryl, aralkyl, aralkenyl, aralkynyl, cycloalkyl, heterocycloalkyl, heteroaryl, heteroarylalkyl, —$R^b$—$OR^a$, —$R^b$—OC(O)—$R^a$, —$R^b$—OC(O)—$OR^a$, —$R^b$—OC(O)—$N(R^a)_2$, —$R^b$—$N(R^a)_2$, —$R^b$—C(O) $R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)S(O)$_tR^a$ (where t is 1 or 2), —$R^b$—S(O)$_tOR^a$ (where t is 1 or 2), —$R^b$—S(O)$_tR^a$ (where t is 1 or 2) and —$R^b$—S(O)$_tN(R^a)_2$ (where t is 1 or 2), where each $R^a$ is independently hydrogen, alkyl, fluoroalkyl, cycloalkyl, cycloalkylalkyl, aryl (optionally substituted with one or more halo groups), aralkyl, heterocycloalkyl, heteroaryl or heteroarylalkyl, each $R^b$ is independently a direct bond or a straight or branched alkylene or alkenylene chain, and $R^c$ is a straight or branched alkylene or alkenylene chain.

"Aryloxy" refers to a radical bonded through an oxygen atom of the formula —O-aryl, where aryl is as defined above.

"Aralkyl" refers to a radical of the formula —$R^c$-aryl where $R^c$ is an alkylene chain as defined above, for example, methylene, ethylene, and the like. The alkylene chain part of the aralkyl radical is optionally substituted as described above for an alkylene chain. The aryl part of the aralkyl radical is optionally substituted as described above for an aryl group.

"Aralkyloxy" refers to a radical bonded through an oxygen atom of the formula —O— aralkyl, where aralkyl is as defined above.

"Aralkenyl" refers to a radical of the formula —$R^d$-aryl where $R^d$ is an alkenylene chain as defined above. The aryl part of the aralkenyl radical is optionally substituted as described above for an aryl group. The alkenylene chain part of the aralkenyl radical is optionally substituted as defined above for an alkenylene group.

"Aralkynyl" refers to a radical of the formula —$R^e$-aryl, where $R^e$ is an alkynylene chain as defined above. The aryl part of the aralkynyl radical is optionally substituted as described above for an aryl group. The alkynylene chain part of the aralkynyl radical is optionally substituted as defined above for an alkynylene chain.

"Cycloalkyl" refers to a stable non-aromatic monocyclic or polycyclic hydrocarbon radical consisting solely of carbon and hydrogen atoms, which includes fused or bridged ring systems, having from three to fifteen carbon atoms. In certain embodiments, a cycloalkyl comprises three to ten carbon atoms. In other embodiments, a cycloalkyl comprises five to seven carbon atoms. The cycloalkyl is attached to the rest of the molecule by a single bond. Cycloalkyls are saturated, (i.e., containing single C—C bonds only) or partially unsaturated (i.e., containing one or more double bonds or triple bonds.) Examples of monocyclic cycloalkyls include, e.g., cyclopropyl, cyclobutyl, cyclopentyl, cyclohexyl, cycloheptyl, and cyclooctyl. In certain embodiments, a cycloalkyl comprises three to eight carbon atoms (e.g., $C_3$-$C_8$ cycloalkyl). In other embodiments, a cycloalkyl comprises three to seven carbon atoms (e.g., $C_3$-$C_7$ cycloalkyl). In other embodiments, a cycloalkyl comprises three to six carbon atoms (e.g., $C_3$-$C_6$ cycloalkyl). In other embodiments, a cycloalkyl comprises three to five carbon atoms (e.g., $C_3$-$C_5$ cycloalkyl). In other embodiments, a cycloalkyl comprises three to four carbon atoms (e.g., $C_3$-$C_4$ cycloalkyl). A partially unsaturated cycloalkyl is also referred to as "cycloalkenyl." Examples of monocyclic cycloalkenyls include, e.g., cyclopentenyl, cyclohexenyl, cycloheptenyl, and cyclooctenyl. Polycyclic cycloalkyl radicals include, for example, adamantyl, norbornyl (i.e., bicyclo[2.2.1]heptanyl), norbornenyl, decalinyl, 7,7-dimethyl-bicyclo[2.2.1]heptanyl, and the like. Unless otherwise stated specifically in the specification, the term "cycloalkyl" is meant to include cycloalkyl radicals optionally substituted by one or more substituents independently selected from alkyl, alkenyl, alkynyl, halo, fluoroalkyl, cyano, nitro, aryl, aralkyl, aralkenyl, aralkynyl, cycloalkyl, heterocycloalkyl, heteroaryl, heteroarylalkyl, —$R^b$—$OR^a$, —$R^b$—OC(O)—$R^a$, —$R^b$—OC(O)—$OR^a$, —$R^b$—OC(O)—N($R^a$)$_2$, —$R^b$—N($R^a$)$_2$, —$R^b$—C(O) $R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)S(O)$_t R^a$ (where t is 1 or 2), —$R^b$—S(O)$_t OR^a$ (where t is 1 or 2), —$R^b$—S(O)$_t R^a$ (where t is 1 or 2) and —$R^b$—S(O)$_t$N($R^a$)$_2$ (where t is 1 or 2), where each $R^a$ is independently hydrogen, alkyl, fluoroalkyl, cycloalkyl, cycloalkylalkyl, aryl (optionally substituted with one or more halo groups), aralkyl, heterocycloalkyl, heteroaryl or heteroarylalkyl, each $R^b$ is independently a direct bond or a straight or branched alkylene or alkenylene chain, and $R^c$ is a straight or branched alkylene or alkenylene chain.

"Halo" or "halogen" refers to bromo, chloro, fluoro or iodo substituents.

"Haloalkyl" refers to an alkyl radical, as defined above, that is substituted by one or more halo radicals, as defined above.

"Fluoroalkyl" refers to an alkyl radical, as defined above, that is substituted by one or more fluoro radicals, as defined above, for example, trifluoromethyl, difluoromethyl, fluoromethyl, 2,2,2-trifluoroethyl, 1-fluoromethyl-2-fluoroethyl, and the like. The alkyl part of the fluoroalkyl radical are optionally substituted as defined above for an alkyl group.

"Haloalkoxy" refers to an alkoxy radical, as defined above, that is substituted by one or more halo radicals, as defined above.

"Heterocycloalkyl" refers to a stable 3- to 18-membered non-aromatic ring radical that comprises two to twelve carbon atoms and from one to six heteroatoms selected from nitrogen, oxygen and sulfur. Unless stated otherwise specifically in the specification, the heterocycloalkyl radical is a monocyclic, bicyclic, tricyclic or tetracyclic ring system, which include fused, spiro, or bridged ring systems. The heteroatoms in the heterocycloalkyl radical are optionally oxidized. One or more nitrogen atoms, if present, are optionally quaternized. The heterocycloalkyl radical is partially or fully saturated. In some embodiments, the heterocycloalkyl is attached to the rest of the molecule through any atom of the ring(s). Examples of such heterocycloalkyl radicals include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, the term "heterocycloalkyl" is meant to include heterocycloalkyl radicals as defined above that are optionally substituted by one or more substituents selected from alkyl, alkenyl, alkynyl, halo, fluoroalkyl, oxo, thioxo, cyano, nitro, aryl, aralkyl, aralkenyl, aralkynyl, cycloalkyl, heterocycloalkyl, heteroaryl, heteroarylalkyl, —$R^b$—$OR^a$, —$R^b$—OC(O)—$R^a$, —$R^b$—OC(O)—$OR^a$, —$R^b$—OC(O)—N($R^a$)$_2$, —$R^b$—N($R^a$)$_2$, —$R^b$—C(O) $R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)S(O)$_t R^a$ (where t is 1 or 2), —$R^b$—S(O)$_t OR^a$ (where t is 1 or 2), —$R^b$—S(O)$_t R^a$ (where t is 1 or 2) and —$R^b$—S(O)$_t$N($R^a$)$_2$ (where t is 1 or 2), where each $R^a$ is independently hydrogen, alkyl, fluoroalkyl, cycloalkyl, cycloalkylalkyl, aryl, aralkyl, heterocycloalkyl, heteroaryl or heteroarylalkyl, each $R^b$ is independently a direct bond or a straight or branched alkylene or alkenylene chain, and $R^c$ is a straight or branched alkylene or alkenylene chain.

"Heteroaryl" refers to a radical derived from a 5- to 18-membered aromatic ring radical that comprises one to seventeen carbon atoms and from one to six heteroatoms selected from nitrogen, oxygen and sulfur. As used herein, the heteroaryl radical is a monocyclic, bicyclic, tricyclic or tetracyclic ring system, wherein at least one of the rings in the ring system is fully unsaturated, i.e., it contains a cyclic, delocalized (4n+2) π-electron system in accordance with the Hückel theory. Heteroaryl includes fused or bridged ring systems. The heteroatom(s) in the heteroaryl radical is optionally oxidized. One or more nitrogen atoms, if present, are optionally quaternized. The heteroaryl is attached to the rest of the molecule through any atom of the ring(s). Unless stated otherwise specifically in the specification, the term "heteroaryl" is meant to include heteroaryl radicals as defined above that are optionally substituted by one or more substituents selected from alkyl, alkenyl, alkynyl, halo, haloalkyl, oxo, thioxo, cyano, nitro, aryl, aralkyl, aralkenyl, aralkynyl, cycloalkyl, heterocycloalkyl, heteroaryl, heteroarylalkyl, —$R^b$—$OR^a$, —$R^b$—OC(O)—$R^a$, —$R^b$—OC(O)—$OR^a$, —$R^b$—OC(O)—N($R^a$)$_2$, —$R^b$—N($R^a$)$_2$, —$R^b$—C(O)$R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)S(O)$_t R^a$ (where t is 1 or 2), —$R^b$—S(O)$_t OR^a$ (where t is 1 or 2), —$R^b$—S(O)$_t R^a$ (where t is 1 or 2) and —$R^b$—S(O)$_t$N($R^a$)$_2$ (where t is 1 or 2), where each $R^a$ is independently hydrogen, alkyl, fluoroalkyl, cycloalkyl, cycloalkylalkyl, aryl, aralkyl, heterocycloalkyl, heteroaryl or heteroarylalkyl, each $R^b$ is independently a direct bond or a straight or branched alkylene or alkenylene chain, and $R^c$ is a straight or branched alkylene or alkenylene chain.

"N-heteroaryl" refers to a heteroaryl radical as defined above containing at least one nitrogen and where the point of attachment of the heteroaryl radical to the rest of the molecule is through a nitrogen atom in the heteroaryl radical. An N-heteroaryl radical is optionally substituted as described above for heteroaryl radicals.

"C-heteroaryl" refers to a heteroaryl radical as defined above and where the point of attachment of the heteroaryl radical to the rest of the molecule is through a carbon atom in the heteroaryl radical. A C-heteroaryl radical is optionally substituted as described above for heteroaryl radicals.

"Heteroaryloxy" refers to radical bonded through an oxygen atom of the formula —O— heteroaryl, where heteroaryl is as defined above.

"Heteroarylalkyl" refers to a radical of the formula —$R^c$-heteroaryl, where $R^c$ is an alkylene chain as defined above. If the heteroaryl is a nitrogen-containing heteroaryl, the heteroaryl is optionally attached to the alkyl radical at the nitrogen atom. The alkylene chain of the heteroarylalkyl radical is optionally substituted as defined above for an alkylene chain. The heteroaryl part of the heteroarylalkyl radical is optionally substituted as defined above for a heteroaryl group.

"Heteroarylalkoxy" refers to a radical bonded through an oxygen atom of the formula —O—$R^c$-heteroaryl, where $R^c$ is an alkylene chain as defined above. If the heteroaryl is a nitrogen-containing heteroaryl, the heteroaryl is optionally attached to the alkyl radical at the nitrogen atom. The alkylene chain of the heteroarylalkoxy radical is optionally substituted as defined above for an alkylene chain. The heteroaryl part of the heteroarylalkoxy radical is optionally substituted as defined above for a heteroaryl group.

In some embodiments, the compounds disclosed herein contain one or more asymmetric centers and thus give rise to enantiomers, diastereomers, and other stereoisomeric forms that are defined, in terms of absolute stereochemistry, as (R)- or (S)—. Unless stated otherwise, it is intended that all stereoisomeric forms of the compounds disclosed herein are contemplated by this disclosure. When the compounds described herein contain alkene double bonds, and unless specified otherwise, it is intended that this disclosure includes both E and Z geometric isomers (e.g., cis or trans.) Likewise, all possible isomers, as well as their racemic and optically pure forms, and all tautomeric forms are also intended to be included. The term "geometric isomer" refers to E or Z geometric isomers (e.g., cis or trans) of an alkene double bond. The term "positional isomer" refers to structural isomers around a central ring, such as ortho-, meta-, and para-isomers around a benzene ring.

A "tautomer" refers to a molecule wherein a proton shift from one atom of a molecule to another atom of the same molecule is possible. In certain embodiments, the compounds presented herein exist as tautomers. In circumstances where tautomerization is possible, a chemical equilibrium of the tautomers will exist. The exact ratio of the tautomers depends on several factors, including physical state, temperature, solvent, and pH. Some examples of tautomeric equilibrium include:

"Prodrugs", includes compounds that, after administration, are metabolized into a pharmacologically active drug (R. B. Silverman, 1992, "The Organic Chemistry of Drug Design and Drug Action," Academic Press, Chp. 8). A prodrug may be used to improve how a compound is absorbed, distributed, metabolized, and excreted.

"Pharmaceutically acceptable salt" includes both acid and base addition salts. A pharmaceutically acceptable salt of any one of the compounds described herein is intended to encompass any and all pharmaceutically suitable salt forms. Preferred pharmaceutically acceptable salts of the compounds described herein are pharmaceutically acceptable acid addition salts and pharmaceutically acceptable base addition salts.

"Pharmaceutically acceptable acid addition salt" refers to those salts which retain the biological effectiveness and properties of the free bases, which are not biologically or otherwise undesirable, and which are formed with inorganic acids such as hydrochloric acid, hydrobromic acid, sulfuric acid, nitric acid, phosphoric acid, hydroiodic acid, hydrofluoric acid, phosphorous acid, and the like. Also included are salts that are formed with organic acids such as aliphatic mono- and dicarboxylic acids, phenyl-substituted alkanoic acids, hydroxy alkanoic acids, alkanedioic acids, aromatic acids, aliphatic and. aromatic sulfonic acids, etc. and include, for example, acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Exemplary salts thus

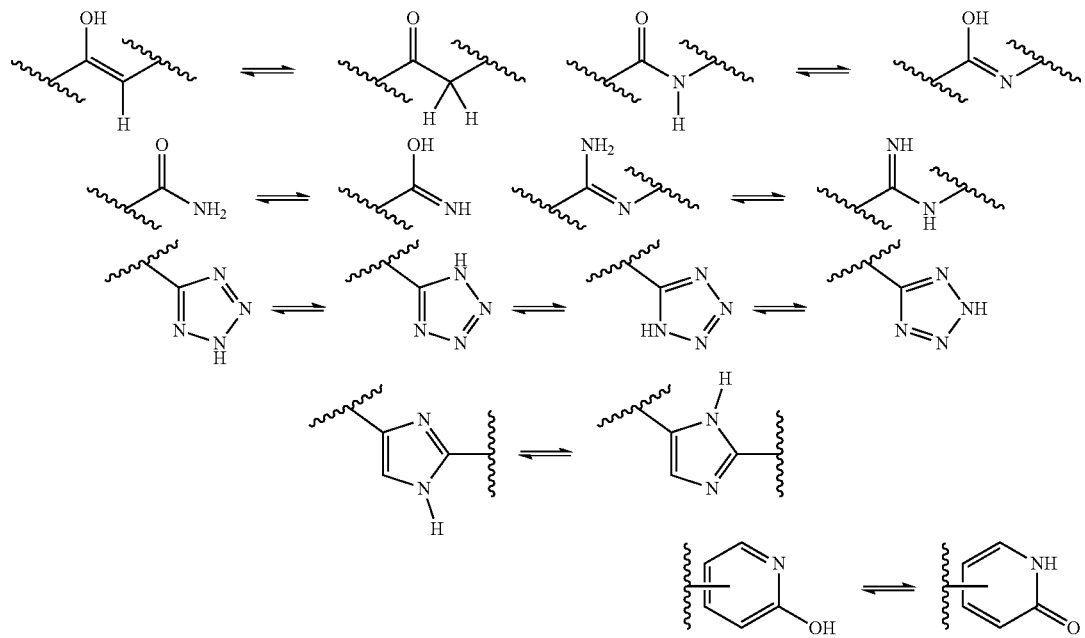

"Optional" or "optionally" means that a subsequently described event or circumstance may or may not occur and that the description includes instances when the event or circumstance occurs and instances in which it does not. For example, "optionally substituted aryl" means that the aryl radical may or may not be substituted and that the description includes both substituted aryl radicals and aryl radicals having no substitution.

include sulfates, pyrosulfates, bisulfates, sulfites, bisulfites, nitrates, phosphates, monohydrogenphosphates, dihydrogenphosphates, metaphosphates, pyrophosphates, chlorides, bromides, iodides, acetates, trifluoroacetates, propionates, caprylates, isobutyrates, oxalates, malonates, succinate suberates, sebacates, fumarates, maleates, mandelates, benzoates, chlorobenzoates, methylbenzoates, dinitrobenzoates, phthalates, benzenesulfonates, toluenesulfonates, phenylacetates, citrates, lactates, malates, tartrates, methanesulfonates, and the like. Also contemplated are salts of amino acids, such as arginates, gluconates, and galacturonates (see, for example, Berge S. M. et al., "Pharmaceutical Salts," *Journal of Pharmaceutical Science,* 66:1-19 (1997)). Acid addition salts of basic compounds are prepared by contacting the free base forms with a sufficient amount of the desired acid to produce the salt.

"Pharmaceutically acceptable base addition salt" refers to those salts that retain the biological effectiveness and properties of the free acids, which are not biologically or otherwise undesirable. These salts are prepared from addition of an inorganic base or an organic base to the free acid. In some embodiments, pharmaceutically acceptable base addition salts are formed with metals or amines, such as alkali and alkaline earth metals or organic amines. Salts derived from inorganic bases include, but are not limited to, sodium, potassium, lithium, ammonium, calcium, magnesium, iron, zinc, copper, manganese, aluminum salts and the like. Salts derived from organic bases include, but are not limited to, salts of primary, secondary, and tertiary amines, substituted amines including naturally occurring substituted amines, cyclic amines and basic ion exchange resins, for example, isopropylamine, trimethylamine, diethylamine, triethylamine, tripropylamine, ethanolamine, diethanolamine, 2-dimethylaminoethanol, 2-diethylaminoethanol, dicyclohexylamine, lysine, arginine, histidine, caffeine, procaine, N,N-dibenzylethylenediamine, chloroprocaine, hydrabamine, choline, betaine, ethylenediamine, ethylenedianiline, N-methylglucamine, glucosamine, methylglucamine, theobromine, purines, piperazine, piperidine, N-ethylpiperidine, polyamine resins and the like. See Berge et al., supra.

The term "mammal" refers to a human, a non-human primate, canine, feline, bovine, ovine, porcine, murine, or other veterinary or laboratory mammal. Those skilled in the art recognize that a therapy which reduces the severity of a pathology in one species of mammal is predictive of the effect of the therapy on another species of mammal.

As used herein, "treatment" or "treating" or "palliating" or "ameliorating" are used interchangeably herein. These terms refers to an approach for obtaining beneficial or desired results including but not limited to therapeutic benefit and/or a prophylactic benefit. By "therapeutic benefit" is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient is still afflicted with the underlying disorder. For prophylactic benefit, the compositions are administered to a patient at risk of developing a particular disease, or to a patient reporting one or more of the physiological symptoms of a disease, even though a diagnosis of this disease has not been made.

Methods

In some embodiments is a method of treating endometriosis, endometriosis-associated pain, and endometriosis-associated symptoms in a mammal in need thereof, the method comprising administering to the mammal a therapeutically effective amount of a P2X3 antagonist. In some embodiments is a method of treating endometriosis, endometriosis-associated pain, and endometriosis-associated symptoms in a mammal in need thereof, the method comprising administering to the mammal a therapeutically effective amount of a P2X3 antagonist, wherein the P2X3 antagonist is a compound of Formula (I), or a pharmaceutically acceptable salt thereof, having the structure:

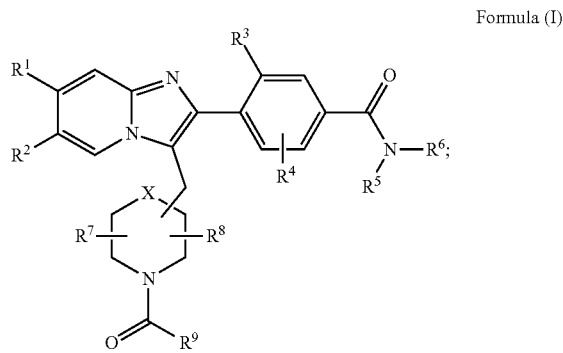

Formula (I)

wherein:
$R^1$ is selected from the group consisting of cyano, halogen, methyl, and ethyl;
$R^2$ is selected from the group consisting of hydrogen, halogen, methyl, and ethyl;
$R^3$ is selected from the group consisting of halogen, methyl, and ethyl;
$R^4$ is selected from the group consisting of hydrogen, halogen, methyl, ethyl, and methoxy;
$R^5$ and $R^6$ are independently selected from the group consisting of hydrogen, $C_1$-$C_6$-alkyl, and hydroxy-$C_1$-$C_6$-alkyl; or
$R^5$ and $R^6$, together with the nitrogen to which they are both attached, form a 5- or 6-member heterocycloalkyl, wherein the heterocycloalkyl is optionally substituted with one or more substituents independently selected from the group consisting of halogen, hydroxyl, and $C_1$-$C_4$-alkyl;
$R^7$ and $R^8$ are independently selected from the group consisting of hydrogen and $C_1$-$C_4$-alkyl;
$R^9$ is selected from the group consisting of $C_1$-$C_6$-alkyl, $C_3$-$C_6$-cycloalkyl, $C_1$-$C_6$-alkyl-$C_3$-$C_6$-cycloalkyl, halo-$C_1$-$C_6$-alkyl, $C_1$-$C_6$-alkoxy, halo-$C_1$-$C_6$-alkoxy, and $C_1$-$C_6$-alkoxy-$C_1$-$C_6$-alkyl; and
X is selected from the group consisting of a bond, $CH_2$, and O.

In some embodiments of the methods described herein, the P2X3 antagonist is a compound of Formula (I), or a pharmaceutically acceptable salt thereof, wherein X is a bond. In some embodiments of the methods described herein, the P2X3 antagonist is a compound of Formula (I), or a pharmaceutically acceptable salt thereof, wherein X is $CH_2$. In some embodiments of the methods described herein, the P2X3 antagonist is a compound of Formula (I), or a pharmaceutically acceptable salt thereof, wherein X is O.

In some embodiments of the methods described herein, the P2X3 antagonist is a compound of Formula (I), or a pharmaceutically acceptable salt thereof, wherein $R^1$ is cyano. In some embodiments of the methods described herein, the P2X3 antagonist is a compound of Formula (I), or a pharmaceutically acceptable salt thereof, wherein $R^1$ is halogen. In some embodiments of the methods described herein, the P2X3 antagonist is a compound of Formula (I), or a pharmaceutically acceptable salt thereof, wherein $R^1$ is methyl. In some embodiments of the methods described herein, the P2X3 antagonist is a compound of Formula (I), or a pharmaceutically acceptable salt thereof, wherein $R^1$ is ethyl.

In some embodiments of the methods described herein, the P2X3 antagonist is a compound of Formula (I), or a pharmaceutically acceptable salt thereof, wherein $R^2$ is hydrogen. In some embodiments of the methods described herein, the P2X3 antagonist is a compound of Formula (I), or a pharmaceutically acceptable salt thereof, wherein $R^2$ is halogen. In some embodiments of the methods described herein, the P2X3 antagonist is a compound of Formula (I), or a pharmaceutically acceptable salt thereof, wherein $R^2$ is methyl. In some embodiments of the methods described herein, the P2X3 antagonist is a compound of Formula (I), or a pharmaceutically acceptable salt thereof, wherein $R^2$ is ethyl.

In some embodiments of the methods described herein, the P2X3 antagonist is a compound of Formula (I), or a pharmaceutically acceptable salt thereof, wherein $R^3$ is halogen. In some embodiments of the methods described herein, the P2X3 antagonist is a compound of Formula (I), or a pharmaceutically acceptable salt thereof, wherein $R^3$ is fluoro. In some embodiments of the methods described herein, the P2X3 antagonist is a compound of Formula (I), or a pharmaceutically acceptable salt thereof, wherein $R^3$ is methyl. In some embodiments of the methods described herein, the P2X3 antagonist is a compound of Formula (I), or a pharmaceutically acceptable salt thereof, wherein $R^3$ is ethyl.

In some embodiments of the methods described herein, the P2X3 antagonist is a compound of Formula (I), or a pharmaceutically acceptable salt thereof, wherein $R^4$ is hydrogen. In some embodiments of the methods described herein, the P2X3 antagonist is a compound of Formula (I), or a pharmaceutically acceptable salt thereof, wherein $R^4$ is halogen. In some embodiments of the methods described herein, the P2X3 antagonist is a compound of Formula (I), or a pharmaceutically acceptable salt thereof, wherein $R^4$ is fluoro. In some embodiments of the methods described herein, the P2X3 antagonist is a compound of Formula (I), or a pharmaceutically acceptable salt thereof, wherein $R^4$ is methyl. In some embodiments of the methods described herein, the P2X3 antagonist is a compound of Formula (I), or a pharmaceutically acceptable salt thereof, wherein $R^4$ is ethyl. In some embodiments of the methods described herein, the P2X3 antagonist is a compound of Formula (I), or a pharmaceutically acceptable salt thereof, wherein $R^4$ is methoxy.

In some embodiments of the methods described herein, the P2X3 antagonist is a compound of Formula (I), or a pharmaceutically acceptable salt thereof, wherein $R^5$ and $R^6$ are independently selected from the group consisting of hydrogen and $C_1$-$C_6$-alkyl. In some embodiments of the methods described herein, the P2X3 antagonist is a compound of Formula (I), or a pharmaceutically acceptable salt thereof, wherein $R^5$ and $R^6$ are each hydrogen. In some embodiments of the methods described herein, the P2X3 antagonist is a compound of Formula (I), or a pharmaceutically acceptable salt thereof, wherein $R^5$ and $R^6$ are each $C_1$-$C_6$-alkyl. In some embodiments of the methods described herein, the P2X3 antagonist is a compound of Formula (I), or a pharmaceutically acceptable salt thereof, wherein $R^5$ is hydrogen and $R^6$ is $C_1$-$C_6$-alkyl. In some embodiments of the methods described herein, the P2X3 antagonist is a compound of Formula (I), or a pharmaceutically acceptable salt thereof, wherein $R^5$ is hydrogen and $R^6$ is methyl.

In some embodiments of the methods described herein, the P2X3 antagonist is a compound of Formula (I), or a pharmaceutically acceptable salt thereof, wherein $R^7$ and $R^8$ are independently selected from the group consisting of hydrogen and methyl. In some embodiments of the methods described herein, the P2X3 antagonist is a compound of Formula (I), or a pharmaceutically acceptable salt thereof, wherein $R^7$ and $R^8$ are each hydrogen. In some embodiments of the methods described herein, the P2X3 antagonist is a compound of Formula (I), or a pharmaceutically acceptable salt thereof, wherein $R^7$ is hydrogen and $R^8$ is methyl.

In some embodiments of the methods described herein, the P2X3 antagonist is a compound of Formula (I), or a pharmaceutically acceptable salt thereof, wherein $R^9$ is selected from the group consisting of $C_1$-$C_6$-alkyl and $C_1$-$C_6$-alkoxy. In some embodiments of the methods described herein, the P2X3 antagonist is a compound of Formula (I), or a pharmaceutically acceptable salt thereof, wherein $R^9$ is $C_1$-$C_6$-alkyl. In some embodiments of the methods described herein, the P2X3 antagonist is a compound of Formula (I), or a pharmaceutically acceptable salt thereof, wherein $R^9$ is methyl. In some embodiments of the methods described herein, the P2X3 antagonist is a compound of Formula (I), or a pharmaceutically acceptable salt thereof, wherein $R^9$ is ethyl. In some embodiments of the methods described herein, the P2X3 antagonist is a compound of Formula (I), or a pharmaceutically acceptable salt thereof, wherein $R^9$ is $C_1$-$C_6$-alkoxy. In some embodiments of the methods described herein, the P2X3 antagonist is a compound of Formula (I), or a pharmaceutically acceptable salt thereof, wherein $R^9$ is methoxy.

In some embodiments of the methods described herein, the P2X3 antagonist is a compound of Formula (I), or a pharmaceutically acceptable salt thereof, wherein the compound of Formula (I) corresponds in structure to and $R^4$ is selected from the group consisting of halogen, methyl, and ethyl. In some embodiments of the methods described herein, the P2X3 antagonist is a compound of Formula (I), or a pharmaceutically acceptable salt thereof, wherein the compound of Formula (I) corresponds in structure to

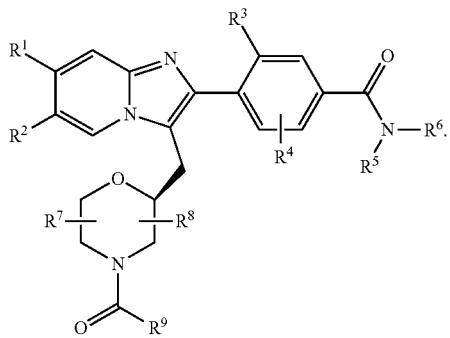

In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is halogen, $R^4$ is halogen, $R^5$ is hydrogen, $R^6$ is $C_1$-$C_6$-alkyl, $R^7$ is hydrogen, $R^8$ is hydrogen, and $R^9$ is $C_1$-$C_6$-alkyl. In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is fluoro, $R^4$ is fluoro, $R^5$ is hydrogen, $R^6$ is methyl, $R^7$ is hydrogen, $R^8$ is hydrogen, and $R^9$ is methyl.

In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is halogen, $R^4$ is halogen, $R^5$ is hydrogen, $R^6$ is $C_1$-$C_6$-alkyl, $R^7$ is hydrogen, $R^8$ is hydrogen, and $R^9$ is $C_1$-$C_6$-alkoxy. In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is fluoro, $R^4$ is fluoro, $R^5$ is hydrogen, $R^6$ is methyl, $R^7$ is hydrogen, $R^8$ is hydrogen, and $R^9$ is methoxy.

In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is methyl, $R^4$ is hydrogen, $R^5$ is hydrogen, $R^6$ is $C_1$-$C_6$-alkyl, $R^7$ is hydrogen, $R^8$ is hydrogen, and $R^9$ is $C_1$-$C_6$-alkyl. In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is methyl, $R^4$ is hydrogen, $R^5$ is hydrogen, $R^6$ is methyl, $R^7$ is hydrogen, $R^8$ is hydrogen, and $R^9$ is methyl.

In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is methyl, $R^4$ is hydrogen, $R^5$ is hydrogen, $R^6$ is $C_1$-$C_6$-alkyl, $R^7$ is hydrogen, $R^8$ is hydrogen, and $R^9$ is $C_1$-$C_6$-alkoxy. In some embodiments of the methods described herein, the P2X3 antagonist is a compound of Formula (I), or a pharmaceutically acceptable salt thereof, wherein X is O, $R^1$ is methyl, $R^2$ is hydrogen, $R^3$ is methyl, $R^4$ is hydrogen, $R^5$ is hydrogen, $R^6$ is methyl, $R^7$ is hydrogen, $R^8$ is hydrogen, and $R^9$ is methoxy.

In some embodiments of the methods described herein, the P2X3 antagonist is a compound of Formula (I), or a pharmaceutically acceptable salt thereof, wherein the compound of Formula (I) corresponds in structure to:

Compound 1

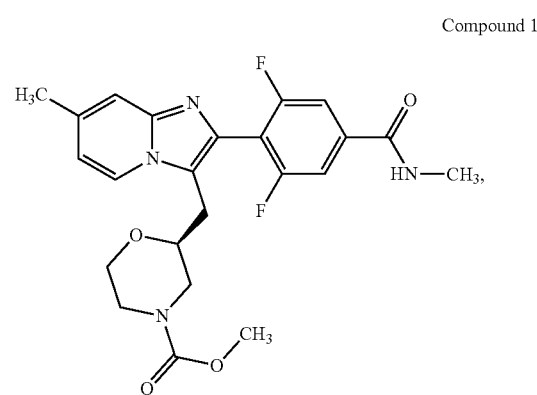 [SMILES: CNC(=O)c1cc(F)c(-c2nc3cc(C)ccn3c2C[C@H]2CN(C(=O)OC)CCO2)c(F)c1]

Compound 2

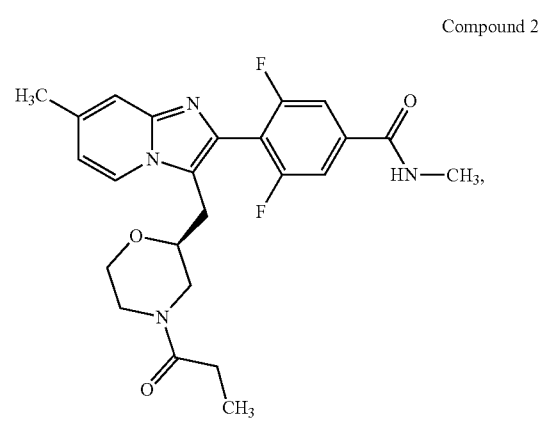

Compound 3

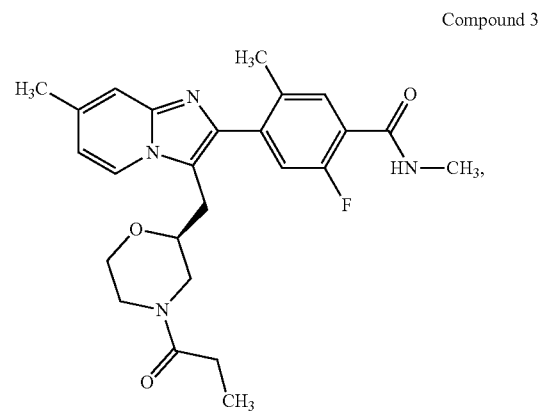

Compound 4

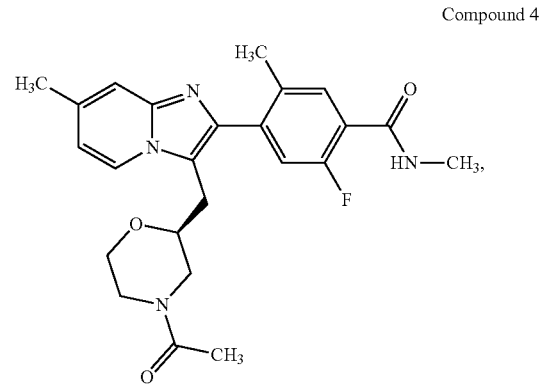

Compound 5
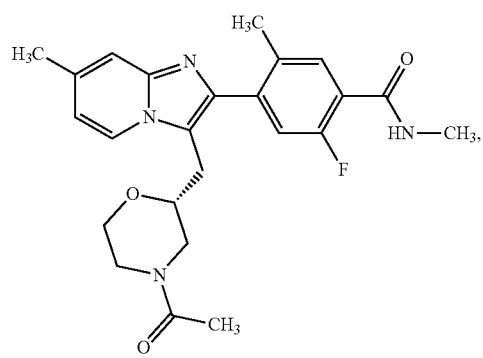
Compound 6
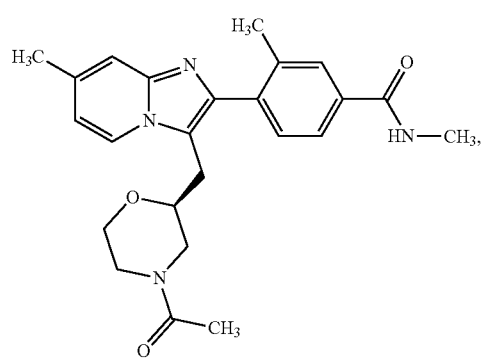
Compound 7
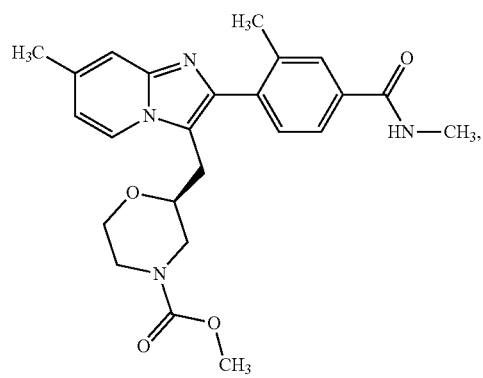
Compound 8
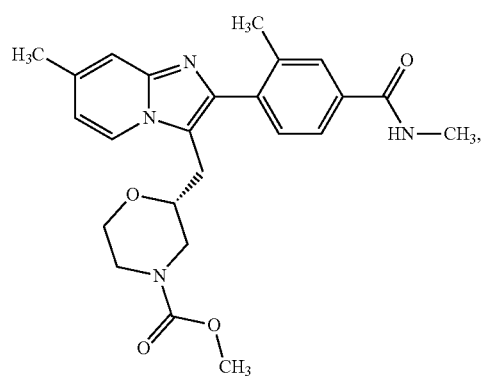
Compound 9
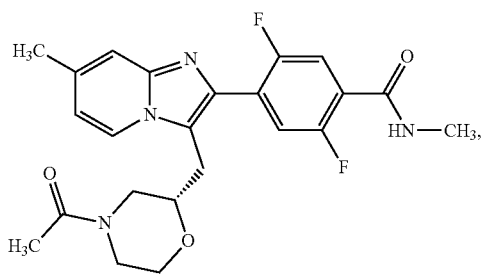
Compound 10
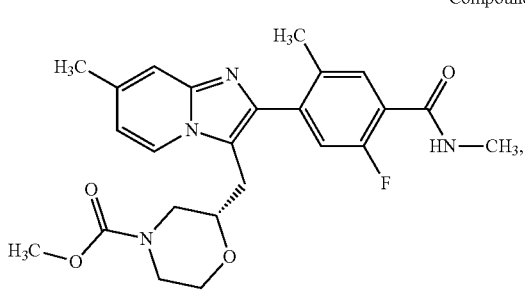
Compound 11
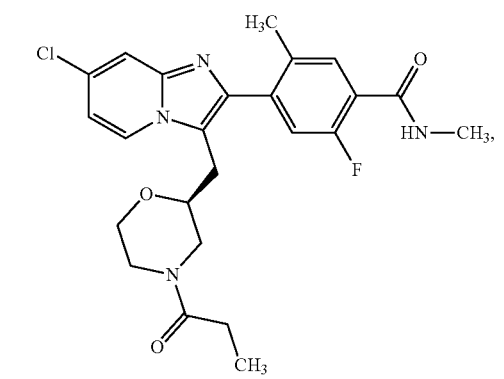
Compound 12
Compound 13
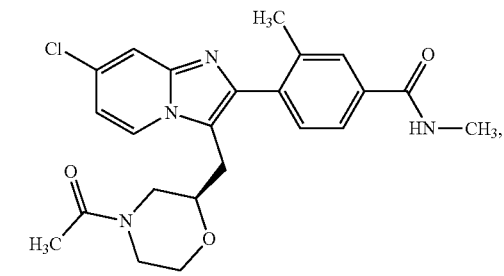

Compound 14
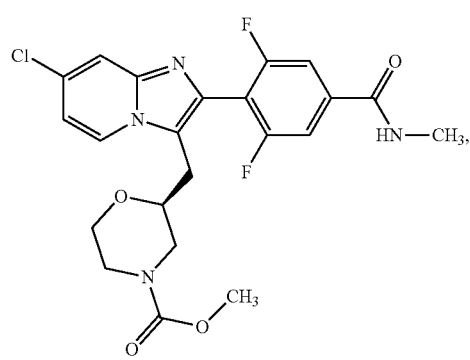
Compound 15
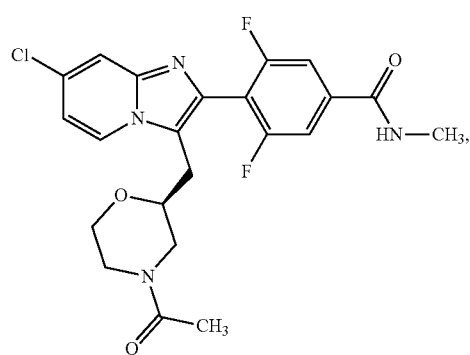
Compound 16
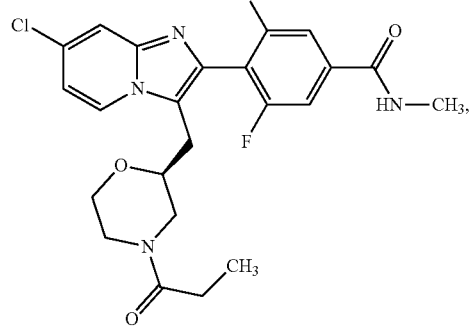
Compound 17
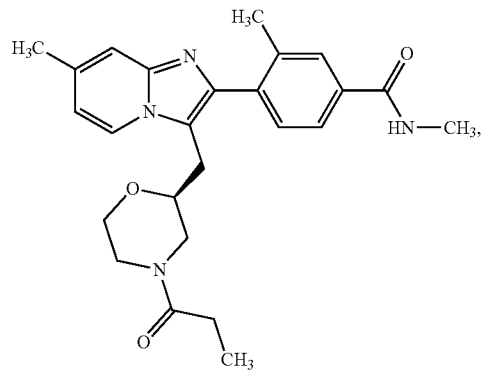
Compound 18
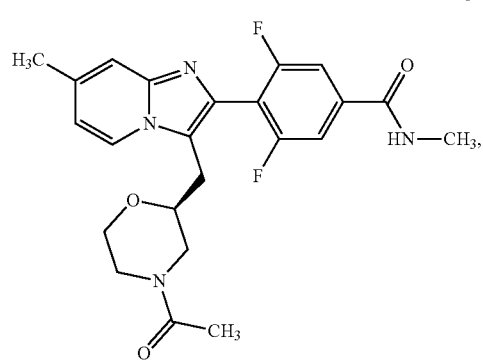
Compound 19
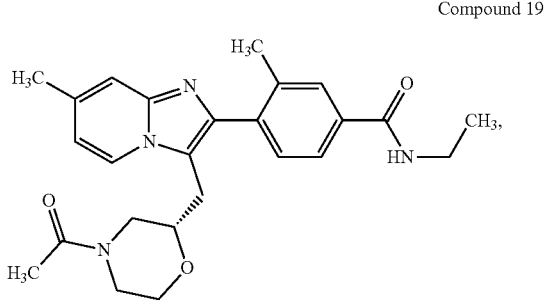
Compound 20
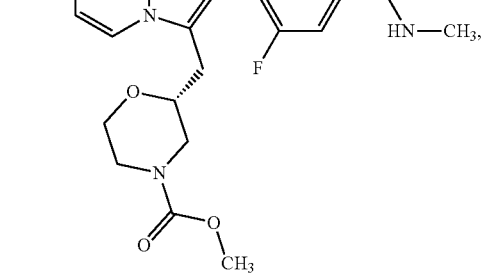
Compound 21
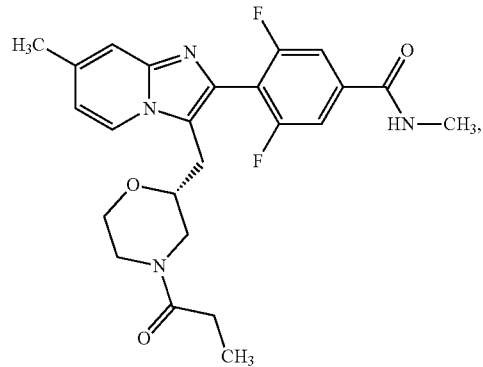

Compound 22

Compound 23

Compound 24

Compound 25

Compound 26

Compound 27

Compound 28

Compound 29

Compound 30

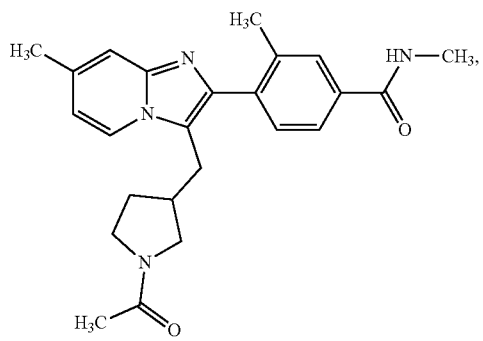

Compound 31

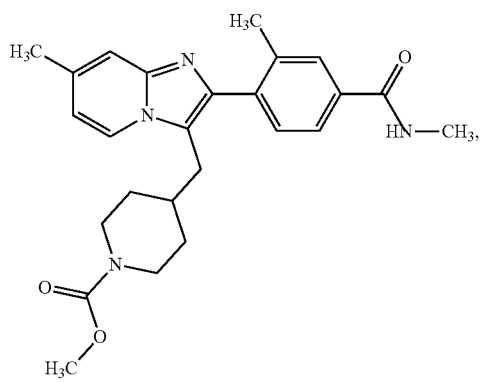

Compound 32

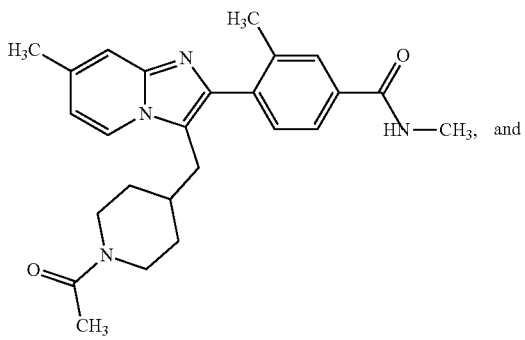

Compound 33

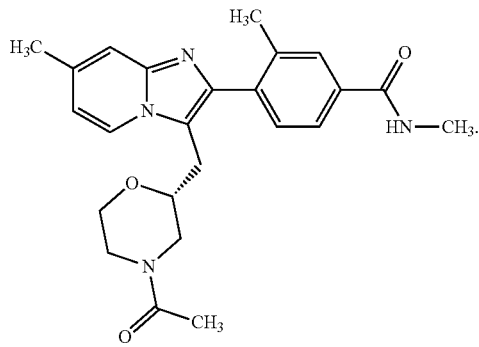

In some embodiments of the methods described herein, the P2X3 antagonist is a compound of Formula (I), or a pharmaceutically acceptable salt thereof, wherein the compound of Formula (I) corresponds in structure to:

(Compound 1)

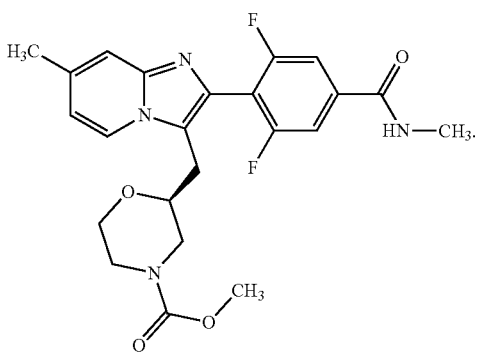

In some embodiments of the methods described herein, the P2X3 antagonist is a compound of Formula (I), or a pharmaceutically acceptable salt thereof, wherein the compound of Formula (I) corresponds in structure to:

(Compound 20)

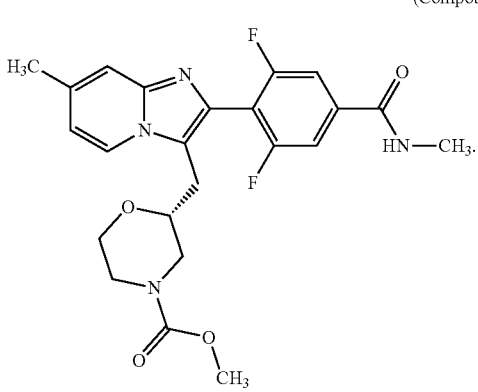

In some embodiments of the methods described herein, the P2X3 antagonist is a compound of Formula (I), or a pharmaceutically acceptable salt thereof, wherein the compound of Formula (I) corresponds in structure to:

(Compound 2)

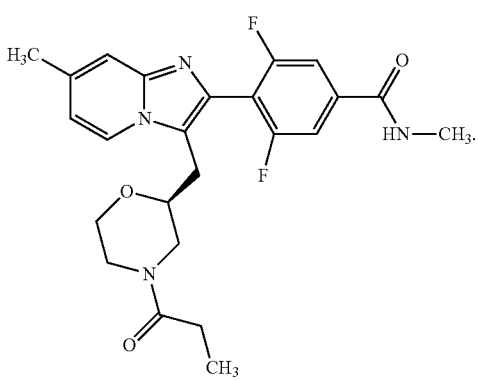

In some embodiments of the methods described herein, the P2X3 antagonist is a compound of Formula (I), or a pharmaceutically acceptable salt thereof, wherein the compound of Formula (I) corresponds in structure to:

(Compound 21)

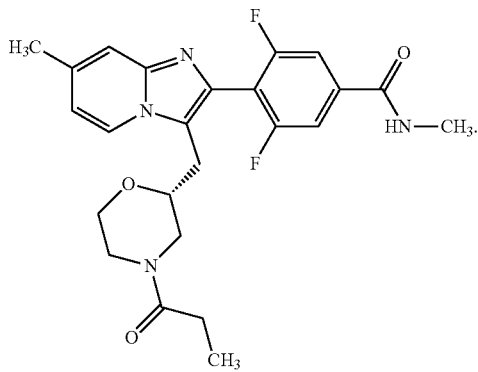

In some embodiments of the methods described herein, the P2X3 antagonist corresponds in structure to:

(Compound 34)

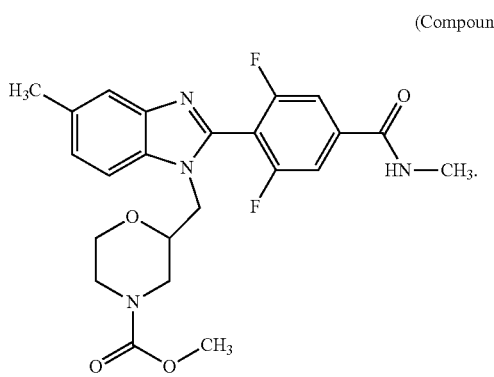

In some embodiments of the methods described herein, the P2X3 antagonist corresponds in structure to:

(Compound 35)

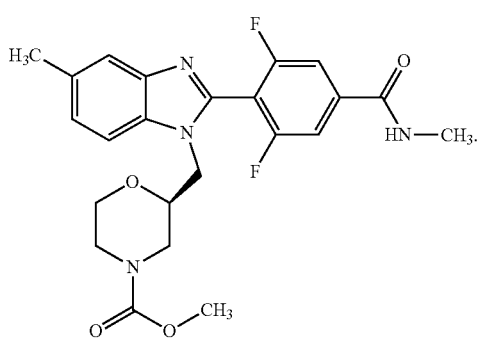

In some embodiments of the methods described herein, the P2X3 antagonist corresponds in structure to:

(Compound 36)

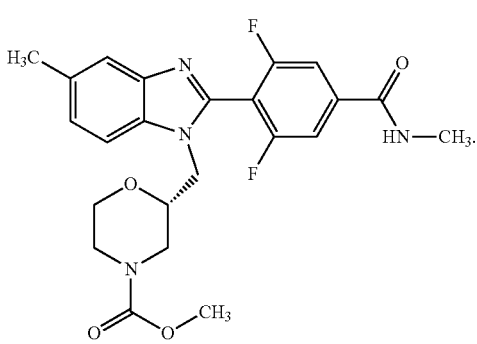

In some embodiments of the methods described herein, is a method of treating endometriosis. In some embodiments of the methods described herein, is a method of treating endometriosis-associated pain. In some embodiments of the methods described herein, is a method of treating endometriosis-associated symptoms. In some embodiments of the methods described herein, is a method of treating endometriosis-associated symptoms selected from dysmenorrhea, dyspareunia, dysuria, and dyschezia. In some embodiments of the methods described herein, is a method of treating dysmenorrhea. In some embodiments of the methods described herein, is a method of treating dyspareunia. In some embodiments of the methods described herein, is a method of treating dysuria. In some embodiments of the methods described herein, is a method of treating dyschezia.

In some embodiments of the methods described herein, endometriosis, endometriosis-associated pain, and endometriosis-associated symptoms are an acute condition. In some embodiments of the methods described herein, endometriosis, endometriosis-associated pain, and endometriosis-associated symptoms are a chronic condition.

In certain embodiments, a disclosed compound utilized by one or more of the foregoing methods is one of the generic, subgeneric, or specific compounds described herein, such as a compound of Formula (I) described herein.

Preparation of the Compounds

The compounds used in the methods described herein are made according to procedures disclosed in U.S. Pat. No. 9,598,409, which is herein incorporated by reference in its entirety, or by known organic synthesis techniques, starting from commercially available chemicals and/or from compounds described in the chemical literature. Commercially available chemicals are obtained from standard commercial sources including Acros Organics (Geel, Belgium), Aldrich Chemical (Milwaukee, WI, including Sigma Chemical and Fluka), Apin Chemicals Ltd. (Milton Park, UK), Ark Pharm, Inc. (Libertyville, IL), Avocado Research (Lancashire, U.K.), BDH Inc. (Toronto, Canada), Bionet (Cornwall, U.K.), Chemservice Inc. (West Chester, PA), Combi-blocks (San Diego, CA), Crescent Chemical Co. (Hauppauge, NY), eMolecules (San Diego, CA), Fisher Scientific Co. (Pittsburgh, PA), Fisons Chemicals (Leicestershire, UK), Frontier Scientific (Logan, UT), ICN Biomedicals, Inc. (Costa Mesa, CA), Key Organics (Cornwall, U.K.), Lancaster Synthesis (Windham, NH), Matrix Scientific, (Columbia, SC), Maybridge Chemical Co. Ltd. (Cornwall, U.K.), Parish Chemical Co. (Orem, UT), Pfaltz & Bauer, Inc. (Waterbury, CN), Polyorganix (Houston, TX), Pierce Chemical Co. (Rockford, IL), Riedel de Haen AG (Hanover, Germany), Ryan Scientific, Inc. (Mount Pleasant, SC), Spectrum Chemicals (Gardena, CA), Sundia Meditech, (Shanghai, China), TCI America (Portland, OR), Trans World Chemicals, Inc. (Rockville, MD), and WuXi (Shanghai, China).

Suitable reference books and treatises that detail the synthesis of reactants useful in the preparation of compounds described herein, or provide references to articles that describe the preparation, include for example, "Synthetic Organic Chemistry", John Wiley & Sons, Inc., New York; S. R. Sandler et al., "Organic Functional Group Preparations," 2nd Ed., Academic Press, New York, 1983; H. O. House, "Modern Synthetic Reactions", 2nd Ed., W. A. Benjamin, Inc. Menlo Park, Calif. 1972; T. L. Gilchrist, "Heterocyclic Chemistry", 2nd Ed., John Wiley & Sons, New York, 1992; J. March, "Advanced Organic Chemistry: Reactions, Mechanisms and Structure", 4th Ed., Wiley-Interscience, New York, 1992. Additional suitable reference books and treatises that detail the synthesis of reactants useful in the preparation of compounds described herein, or provide references to articles that describe the preparation, include for example, Fuhrhop, J. and Penzlin G. "Organic Synthesis: Concepts, Methods, Starting Materials", Second, Revised and Enlarged Edition (1994) John Wiley & Sons ISBN: 3-527-29074-5; Hoffman, R. V. "Organic Chemistry, An Intermediate Text" (1996) Oxford University Press, ISBN 0-19-509618-5; Larock, R. C. "Comprehensive Organic Transformations: A Guide to Functional Group Preparations" 2nd Edition (1999) Wiley-VCH, ISBN: 0-471-19031-4; March, J. "Advanced Organic Chemistry: Reactions, Mechanisms, and Structure" 4th Edition (1992) John Wiley & Sons, ISBN: 0-471-60180-2; Otera, J. (editor) "Modern Carbonyl Chemistry" (2000) Wiley-VCH, ISBN: 3-527-29871-1; Patai, S. "Patai's 1992 Guide to the Chemistry of Functional Groups" (1992) Interscience ISBN: 0-471-93022-9; Solomons, T. W. G. "Organic Chemistry" 7th Edition (2000) John Wiley & Sons, ISBN: 0-471-19095-0; Stowell, J. C., "Intermediate Organic Chemistry" 2nd Edition (1993) Wiley-Interscience, ISBN: 0-471-57456-2; "Industrial Organic Chemicals: Starting Materials and Intermediates: An Ullmann's Encyclopedia" (1999) John Wiley & Sons, ISBN: 3-527-29645-X, in 8 volumes; "Organic Reactions" (1942-2000) John Wiley & Sons, in over 55 volumes; and "Chemistry of Functional Groups" John Wiley & Sons, in 73 volumes.

Specific and analogous reactants are also identified through the indices of known chemicals prepared by the Chemical Abstract Service of the American Chemical Society, which are available in most public and university libraries, as well as through on-line databases (the American Chemical Society, Washington, D.C., may be contacted for more details). Chemicals that are known but not commercially available in catalogs are optionally prepared by custom chemical synthesis houses, where many of the standard chemical supply houses (e.g., those listed above) provide custom synthesis services. A reference for the preparation and selection of pharmaceutical salts of the compounds described herein is P. H. Stahl & C. G. Wermuth "Handbook of Pharmaceutical Salts", Verlag Helvetica Chimica Acta, Zurich, 2002.

Further Forms of Compounds Disclosed Herein

Isomers

Furthermore, in some embodiments, the compounds described herein exist as geometric isomers. In some embodiments, the compounds described herein possess one or more double bonds. The compounds presented herein include all cis, trans, syn, anti, entgegen (E), and zusammen (Z) isomers as well as the corresponding mixtures thereof. In some situations, compounds exist as tautomers. The compounds described herein include all possible tautomers within the formulas described herein. In some situations, the compounds described herein possess one or more chiral centers and each center exists in the R configuration, or S configuration. The compounds described herein include all diastereomeric, enantiomeric, and epimeric forms as well as the corresponding mixtures thereof. In additional embodiments of the compounds and methods provided herein, mixtures of enantiomers and/or diastereoisomers, resulting from a single preparative step, combination, or interconversion are useful for the applications described herein. In some embodiments, the compounds described herein are prepared as their individual stereoisomers by reacting a racemic mixture of the compound with an optically active resolving agent to form a pair of diastereoisomeric compounds, separating the diastereomers and recovering the optically pure enantiomers. In some embodiments, dissociable complexes are preferred (e.g., crystalline diastereomeric salts). In some embodiments, the diastereomers have distinct physical properties (e.g., melting points, boiling points, solubilities, reactivity, etc.) and are separated by taking advantage of these dissimilarities. In some embodiments, the diastereomers are separated by chiral chromatography, or preferably, by separation/resolution techniques based upon differences in solubility. In some embodiments, the optically pure enantiomer is then recovered, along with the resolving agent, by any practical means that would not result in racemization.

Labeled Compounds

In some embodiments, the compounds described herein exist in their isotopically-labeled forms. In some embodiments, the methods disclosed herein include methods of treating diseases by administering such isotopically-labeled compounds. In some embodiments, the methods disclosed herein include methods of treating diseases by administering such isotopically-labeled compounds as pharmaceutical compositions. Thus, in some embodiments, the compounds disclosed herein include isotopically-labeled compounds, which are identical to those recited herein, but for the fact that one or more atoms are replaced by an atom having an atomic mass or mass number different from the atomic mass or mass number usually found in nature. Examples of isotopes that are incorporated into compounds of the invention include isotopes of hydrogen, carbon, nitrogen, oxygen, phosphorous, sulfur, fluorine and chloride, such as $^{2}H$, $^{3}H$, $^{13}C$, $^{14}C$, $^{15}N$, $^{16}O$, $^{17}O$, $^{31}P$, $^{32}P$, $^{35}S$, $^{18}F$, and $^{36}Cl$, respectively. Compounds described herein, and the pharmaceutically acceptable salts, esters, solvate, hydrates or derivatives thereof which contain the aforementioned isotopes and/or other isotopes of other atoms are within the scope of this invention. Certain isotopically-labeled compounds, for example those into which radioactive isotopes such as $^{3}H$ and $^{14}C$ are incorporated, are useful in drug and/or substrate tissue distribution assays. Tritiated, i. e., $^{3}H$ and carbon-14, i. e., $^{14}C$, isotopes are particularly preferred for their ease of preparation and detectability. Further, substitution with heavy isotopes such as deuterium, i.e., $^{2}H$, produces certain therapeutic advantages resulting from greater metabolic stability, for example increased in vivo half-life or reduced dosage requirements. In some embodiments, the isotopically labeled compounds, pharmaceutically acceptable salt, ester, solvate, hydrate or derivative thereof is prepared by any suitable method.

In some embodiments, the compounds described herein are labeled by other means, including, but not limited to, the use of chromophores or fluorescent moieties, bioluminescent labels, or chemiluminescent labels.

Pharmaceutically Acceptable Salts

In some embodiments, the compounds described herein exist as their pharmaceutically acceptable salts. In some embodiments, the methods disclosed herein include methods of treating diseases by administering such pharmaceutically acceptable salts. In some embodiments, the methods disclosed herein include methods of treating diseases by administering such pharmaceutically acceptable salts as pharmaceutical compositions.

In some embodiments, the compounds described herein possess acidic or basic groups and therefore react with any of a number of inorganic or organic bases, and inorganic and organic acids, to form a pharmaceutically acceptable salt. In some embodiments, these salts are prepared in situ during the final isolation and purification of the compounds of the invention, or by separately reacting a purified compound in its free form with a suitable acid or base, and isolating the salt thus formed.

Prodrugs

In some embodiments, the compounds described herein are formulated as agents which are converted in vivo to active forms in order to alter the biodistribution or the pharmacokinetics for a particular agent. For example, a carboxylic acid group can be esterified, e.g., with a methyl group or an ethyl group to yield an ester. When the ester is administered to a subject, the ester is cleaved, enzymatically or non enzymatically, reductively, oxidatively, or hydrolytically, to reveal the anionic group. An anionic group can be esterified with moieties (e.g., acyloxymethyl esters) which are cleaved to reveal an intermediate agent which subsequently decomposes to yield the active agent. The prodrug moieties may be metabolized in vivo by esterases or by other mechanisms to carboxylic acids. Alternatively, other functional groups may be modified into a prodrug form. For instance, an amine group may be converted into a carbamate or amide which would be cleavable in vivo.

Solvates

In some embodiments, the compounds described herein exist as solvates. The invention provides for methods of treating diseases by administering such solvates. The invention further provides for methods of treating diseases by administering such solvates as pharmaceutical compositions.

Solvates contain either stoichiometric or non-stoichiometric amounts of a solvent, and, in some embodiments, are formed during the process of crystallization with pharmaceutically acceptable solvents such as water, ethanol, and the like. Hydrates are formed when the solvent is water, or alcoholates are formed when the solvent is alcohol. Solvates of the compounds described herein are conveniently prepared or formed during the processes described herein. By way of example only, hydrates of the compounds described herein are conveniently prepared by recrystallization from an aqueous/organic solvent mixture, using organic solvents including, but not limited to, dioxane, tetrahydrofuran or methanol. In addition, the compounds provided herein exist in unsolvated as well as solvated forms. In general, the solvated forms are considered equivalent to the unsolvated forms for the purposes of the compounds and methods provided herein.

Pharmaceutical Compositions

In certain embodiments, the compounds described herein are administered as a pure chemical. In other embodiments, the compounds described herein are combined with a pharmaceutically suitable or acceptable carrier (also referred to herein as a pharmaceutically suitable (or acceptable) excipient, physiologically suitable (or acceptable) excipient, or physiologically suitable (or acceptable) carrier) selected on the basis of a chosen route of administration and standard pharmaceutical practice as described, for example, in *Remington: The Science and Practice of Pharmacy* (Gennaro, 21$^{st}$ Ed. Mack Pub. Co., Easton, PA (2005)).

Accordingly, provided herein is a pharmaceutical composition comprising at least one compound described herein, or a pharmaceutically acceptable salt, together with one or more pharmaceutically acceptable carriers. The carrier(s) (or excipient(s)) is acceptable or suitable if the carrier is compatible with the other ingredients of the composition and not deleterious to the recipient (i.e., the subject) of the composition.

One embodiment provides a pharmaceutical composition comprising a pharmaceutically acceptable carrier and a compound of Formula (I), or a pharmaceutically acceptable salt thereof.

Another embodiment provides a pharmaceutical composition consisting essentially of a pharmaceutically acceptable carrier and a compound of Formula (I), or a pharmaceutically acceptable salt thereof.

In certain embodiments, the compound as described herein is substantially pure, in that it contains less than about 5%, or less than about 1%, or less than about 0.1%, of other organic small molecules, such as contaminating intermediates or by-products that are created, for example, in one or more of the steps of a synthesis method.

These formulations include those suitable for oral, topical, buccal, parenteral (e.g., subcutaneous, intramuscular, intradermal, or intravenous), or aerosol administration.

Exemplary pharmaceutical compositions are used in the form of a pharmaceutical preparation, for example, in solid, semisolid or liquid form, which includes one or more of a disclosed compound, as an active ingredient, in a mixture with an organic or inorganic carrier or excipient suitable for external, enteral or parenteral applications. In some embodiments, the active ingredient is compounded, for example, with the usual non-toxic, pharmaceutically acceptable carriers for tablets, pellets, capsules, suppositories, solutions, emulsions, suspensions, and any other form suitable for use. The active object compound is included in the pharmaceutical composition in an amount sufficient to produce the desired effect upon the process or condition of the disease.

In some embodiments, a compound of Formula (I) described herein are administered to subjects in a biologically compatible form suitable for topical administration to treat or prevent dermal diseases, disorders or conditions. By "biologically compatible form suitable for topical administration" is meant a form of the compound of Formula (I) to be administered in which any toxic effects are outweighed by the therapeutic effects of the inhibitor. Administration of a compound of Formula (I) as described herein can be in any pharmacological form including a therapeutically effective amount of a compound of Formula (I) alone or in combination with a pharmaceutically acceptable carrier.

Topical administration of a compound of Formula (I) may be presented in the form of an aerosol, a semi-solid pharmaceutical composition, a powder, or a solution. By the term "a semi-solid composition" is meant an ointment, cream, salve, jelly, or other pharmaceutical composition of substantially similar consistency suitable for application to the skin. Examples of semi-solid compositions are given in Chapter 17 of The Theory and Practice of Industrial Pharmacy, Lachman, Lieberman and Kanig, published by Lea and Febiger (1970) and in Chapter 67 of Remington's Pharmaceutical Sciences, 15th Edition (1975) published by Mack Publishing Company.

Dermal or skin patches are another method for transdermal delivery of the therapeutic or pharmaceutical compositions described herein. Patches can provide an absorption enhancer such as DMSO to increase the absorption of the compounds. Patches can include those that control the rate of drug delivery to the skin. Patches may provide a variety of dosing systems including a reservoir system or a monolithic system, respectively. The reservoir design may, for example, have four layers: the adhesive layer that directly contacts the skin, the control membrane, which controls the diffusion of drug molecules, the reservoir of drug molecules, and a water-resistant backing. Such a design delivers uniform amounts of the drug over a specified time period, the rate of delivery has to be less than the saturation limit of different types of skin. The monolithic design, for example, typically has only three layers: the adhesive layer, a polymer matrix containing the compound, and a water-proof backing. This design brings a saturating amount of drug to the skin. Thereby, delivery is controlled by the skin. As the drug amount decreases in the patch to below the saturating level, the delivery rate falls.

In one embodiment, the topical composition may, for example, take the form of hydrogel based on polyacrylic acid or polyacrylamide; as an ointment, for example with polyethylene glycol (PEG) as the carrier, like the standard ointment DAB 8 (50% PEG 300, 50% PEG 1500); or as an emulsion, especially a microemulsion based on water-in-oil or oil-in-water, optionally with added liposomes. Suitable permeation accelerators (entraining agents) include sulfoxide derivatives such as dimethylsulfoxide (DMSO) or decylmethylsulfoxide (decyl-MSO) and transcutol (diethyleneglycolmonoethylether) or cyclodextrin; as well as pyrrolidones, for example 2-pyrrolidone, N-methyl-2-pyrrolidone, 2-pyrrolidone-5-carboxylic acid, or the biodegradable N-(2-hydroxyethyl)-2-pyrrolidone and the fatty acid esters thereof, urea derivatives such as dodecylurea, 1,3-didodecylurea, and 1,3-diphenylurea; terpenes, for example D-limonene, menthone, a-terpinol, carvol, limonene oxide, or 1,8-cineol.

Ointments, pastes, creams and gels also can contain excipients, such as starch, tragacanth, cellulose derivatives, polyethylene glycols, silicones, bentonites, silicic acid, and talc, or mixtures thereof. Powders and sprays also can contain excipients such as lactose, talc, silicic acid, aluminum hydroxide, calcium silicates and polyamide powder, or mixtures of these substances. Solutions of nanocrystalline antimicrobial metals can be converted into aerosols or sprays by any of the known means routinely used for making aerosol pharmaceuticals. In general, such methods comprise pressurizing or providing a means for pressurizing a container of the solution, usually with an inert carrier gas, and passing the pressurized gas through a small orifice. Sprays can additionally contain customary propellants, such a chlorofluorohydrocarbons and volatile unsubstituted hydrocarbons, such as butane and propane.

In some embodiments for preparing solid compositions such as tablets, the principal active ingredient is mixed with a pharmaceutical carrier, e.g., conventional tableting ingredients such as corn starch, lactose, sucrose, sorbitol, talc, stearic acid, magnesium stearate, dicalcium phosphate or gums, and other pharmaceutical diluents, e.g., water, to form a solid preformulation composition containing a homogeneous mixture of a disclosed compound or a non-toxic pharmaceutically acceptable salt thereof. When referring to these preformulation compositions as homogeneous, it is meant that the active ingredient is dispersed evenly throughout the composition so that the composition is readily subdivided into equally effective unit dosage forms such as tablets, pills and capsules.

In solid dosage forms for oral administration (capsules, tablets, pills, dragees, powders, granules and the like), the subject composition is mixed with one or more pharmaceutically acceptable carriers, such as sodium citrate or dicalcium phosphate, and/or any of the following: (1) fillers or extenders, such as starches, cellulose, microcrystalline cellulose, silicified microcrystalline cellulose, lactose, sucrose, glucose, mannitol, and/or silicic acid; (2) binders, such as, for example, carboxymethylcellulose, hypromellose, alginates, gelatin, polyvinyl pyrrolidone, sucrose and/or acacia; (3) humectants, such as glycerol; (4) disintegrating agents, such as crospovidone, croscarmellose sodium, sodium starch glycolate, agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, docusate sodium, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; and (10) coloring agents. In the case of capsules, tablets and pills, in some embodiments, the compositions comprise buffering agents. In some embodiments, solid compositions of a similar type are also employed as fillers in soft and hard-filled gelatin capsules using such excipients as lactose or milk sugars, as well as high molecular weight polyethylene glycols and the like.

In some embodiments, a tablet is made by compression or molding, optionally with one or more accessory ingredients. In some embodiments, compressed tablets are prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. In some embodiments, molded tablets are made by molding in a suitable machine a mixture of the subject composition moistened with an inert liquid diluent. In some embodiments, tablets, and other solid dosage forms, such as dragees, capsules, pills and granules, are scored or prepared with coatings and shells, such as enteric coatings and other coatings.

Compositions for inhalation or insufflation include solutions and suspensions in pharmaceutically acceptable, aqueous or organic solvents, or mixtures thereof, and powders. Liquid dosage forms for oral administration include pharmaceutically acceptable emulsions, microemulsions, solutions, suspensions, syrups and elixirs. In addition to the subject composition, in some embodiments, the liquid dosage forms contain inert diluents, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, cyclodextrins and mixtures thereof.

In some embodiments, suspensions, in addition to the subject composition, contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

In some embodiments, powders and sprays contain, in addition to a subject composition, excipients such as lactose, talc, silicic acid, aluminum hydroxide, calcium silicates and polyamide powder, or mixtures of these substances. In some embodiments, sprays additionally contain customary propellants, such as chlorofluorohydrocarbons and volatile unsubstituted hydrocarbons, such as butane and propane.

Compositions and compounds disclosed herein alternatively are administered by aerosol. This is accomplished by preparing an aqueous aerosol, liposomal preparation or solid particles containing the compound. In some embodiments, a non-aqueous (e.g., fluorocarbon propellant) suspension is used. In some embodiments, sonic nebulizers are used because they minimize exposing the agent to shear, which results in degradation of the compounds contained in the subject compositions. Ordinarily, an aqueous aerosol is made by formulating an aqueous solution or suspension of a subject composition together with conventional pharmaceutically acceptable carriers and stabilizers. The carriers and stabilizers vary with the requirements of the particular subject composition, but typically include non-ionic surfactants (Tweens, Pluronics, or polyethylene glycol), innocuous proteins like serum albumin, sorbitan esters, oleic acid, lecithin, amino acids such as glycine, buffers, salts, sugars or sugar alcohols. Aerosols generally are prepared from isotonic solutions.

Pharmaceutical compositions suitable for parenteral administration comprise a subject composition in combination with one or more pharmaceutically-acceptable sterile isotonic aqueous or non-aqueous solutions, dispersions, suspensions or emulsions, or sterile powders which are reconstituted into sterile injectable solutions or dispersions just prior to use, which, in some embodiments, contain antioxidants, buffers, bacteriostats, solutes which render the formulation isotonic with the blood of the intended recipient or suspending or thickening agents.

Examples of suitable aqueous and non-aqueous carriers which are employed in the pharmaceutical compositions include water, ethanol, polyols (such as glycerol, propylene glycol, polyethylene glycol, and the like), and suitable mixtures thereof, vegetable oils, such as olive oil, and injectable organic esters, such as ethyl oleate and cyclodextrins. Proper fluidity is maintained, for example, by the use of coating materials, such as lecithin, by the maintenance of the required particle size in the case of dispersions, and by the use of surfactants The dose of the composition comprising at least one compound described herein differs, depending upon the patient's (e.g., human) condition, that is, stage of the disease, general health status, age, and other factors.

Pharmaceutical compositions are administered in a manner appropriate to the disease to be treated (or prevented). An appropriate dose and a suitable duration and frequency of administration will be determined by such factors as the condition of the patient, the type and severity of the patient's disease, the particular form of the active ingredient, and the method of administration. In general, an appropriate dose and treatment regimen provides the composition(s) in an amount sufficient to provide therapeutic and/or prophylactic benefit (e.g., an improved clinical outcome, such as more frequent complete or partial remissions, or longer disease-free and/or overall survival, or a lessening of symptom severity). Optimal doses are generally determined using experimental models and/or clinical trials. In some embodiments, the optimal dose depends upon the body mass, weight, or blood volume of the patient.

Oral doses typically range from about 1.0 mg to about 1000 mg, one to four times, or more, per day.

Pharmaceutical Combinations

Also contemplated herein are combination therapies, for example, co-administering a disclosed compound and an additional active agent, as part of a specific treatment regimen intended to provide the beneficial effect from the co-action of these therapeutic agents. The beneficial effect of the combination includes, but is not limited to, pharmacokinetic or pharmacodynamic co-action resulting from the combination of therapeutic agents. Administration of these therapeutic agents in combination typically is carried out over a defined time period (usually weeks, months or years depending upon the combination selected). Combination therapy is intended to embrace administration of multiple therapeutic agents in a sequential manner, that is, wherein each therapeutic agent is administered at a different time, as well as administration of these therapeutic agents, or at least two of the therapeutic agents, in a substantially simultaneous manner.

Substantially simultaneous administration is accomplished, for example, by administering to the subject a single formulation or composition, (e.g., a tablet or capsule having a fixed ratio of each therapeutic agent or in multiple, single formulations (e.g., capsules) for each of the therapeutic agents. Sequential or substantially simultaneous administration of each therapeutic agent is effected by any appropriate route including, but not limited to, oral routes, intravenous routes, intramuscular routes, and direct absorption through mucous membrane tissues. The therapeutic agents are administered by the same route or by different routes. For example, a first therapeutic agent of the combination selected is administered by intravenous injection while the other therapeutic agents of the combination are administered orally. Alternatively, for example, all therapeutic agents are administered orally or all therapeutic agents are administered by intravenous injection.

In some embodiments is a method of treating endometriosis, endometriosis-associated pain, and endometriosis-associated symptoms in a mammal in need thereof, the method comprising administering to the mammal a P2X3 antagonist further comprising administering to the mammal one or more additional pharmaceutical agents. In some embodiments is a method of treating endometriosis, endometriosis-associated pain, and endometriosis-associated symptoms in a mammal in need thereof, the method comprising administering to the mammal a compound of Formula (I) further comprising administering to the mammal one or more additional pharmaceutical agents. In some embodiments, the one or more additional pharmaceutical agents are selected from the group consisting of selected from a hormonal contraceptive, a non-steroidal anti-inflammatory agent (NSAID), a prostaglandin E synthase (PTGES) inhibitor, an interleukin-1 receptor-associated kinase 4 (IRAK4) inhibitor, a prostanoid EP4 receptor antagonist, an aldo-keto reductase 1C3 (AKR1C3) inhibitor, and a prolactin receptor (PRLR) antagonist. In some embodiments, the additional pharmaceutical agent is a hormonal contraceptive. In some embodiments, the additional pharmaceutical agent is a non-steroidal anti-inflammatory agent (NSAID). In some embodiments, the additional pharmaceutical agent is a prostaglandin E synthase (PTGES) inhibitor. In some embodiments, the additional pharmaceutical agent is an interleukin-1 receptor-associated kinase 4 (IRAK4) inhibitor. In some embodiments, the additional pharmaceutical agent is a prostanoid EP4 receptor antagonist. In some embodiments, the additional pharmaceutical agent is an aldo-keto reductase 1C3 (AKR1C3) inhibitor. In some embodiments, the additional pharmaceutical agent is a prolactin receptor (PRLR) antagonist.

Combination therapy also embraces the administration of the therapeutic agents as described above in further combination with other biologically active ingredients and non-drug therapies. Where the combination therapy further comprises a non-drug treatment, the non-drug treatment is conducted at any suitable time so long as a beneficial effect from the co-action of the combination of the therapeutic agents and non-drug treatment is achieved. For example, in appropriate cases, the beneficial effect is still achieved when the non-drug treatment is temporally removed from the administration of the therapeutic agents, perhaps by days or even weeks.

The components of the combination are administered to a patient simultaneously or sequentially. It will be appreciated that the components are present in the same pharmaceutically acceptable carrier and, therefore, are administered simultaneously. Alternatively, the active ingredients are present in separate pharmaceutical carriers, such as conventional oral dosage forms, that are administered either simultaneously or sequentially.

EXAMPLES

This example is provided for illustrative purposes only and not to limit the scope of the claims provided herein.

Example 1: Syngeneic Mouse Model of Endometriosis

A P2X3 receptor antagonist compound of Formula (I) described herein was evaluated in the syngeneic mouse model of endometriosis.

Part 1: Surgery to Transplant Syngeneic Endometrial Tissue
C57BL/6 mice (8 weeks old) were anesthetized before making a vertical incision on the abdomen. The uterus was collected and divided into pieces of 5 millimeters which were then surgically sutured onto the peritoneum of syngeneic recipient animals. The recipient mice were also treated with oestradiol and the resulting lesions were allowed to develop for 11 weeks.

Part 2: Evaluation of Test Compound
Baseline measurements were established on Day 0 by measuring mechanical allodynia in all transplanted mice using a von Frey pain stimulation procedure in accordance with the protocol described below. On Day 1 transplanted mice were injected with saline (i.p.) and mechanical allodynia was again measured using the von Frey filament method (control). For each of Day 4 and Day 5, transplanted mice were treated (i.p.) with either Compound 1 (30 mg/kg) or the positive control (Meloxicam, 5 mg/kg). Mechanical allodynia was evaluated using the von Frey pain stimulation procedure. All allodynia measurements took place one hour following treatment. The mice were euthanized on Day 6 and evaluated for the presence of endometriotic lesions.

Von Frey Pain Stimulation Procedure
Animals were placed in small cages with a mesh or otherwise penetrable bottom. The pain threshold was evaluated with von Frey filaments using the simplified up-down method, which determines the mechanical force required to elicit a positive pain response in animals.

A von Frey monofilament was applied perpendicularly to the abdomen until it buckled, delivering a constant predetermined force. The testing force progressed with applications of different force filaments following an up-down sequence such that a positive response to a filament indicated the next lower force filament to be used, while a negative response indicated the next higher force filament to be used. The pain threshold was measured on the abdomen of each animal. The von Frey monofilaments were applied on the lower to mid abdomen for 1-2 s, with an inter-stimulus interval of at least 10 s. Care was taken to avoid the external genitalia and to not stimulate the same point twice in succession. Sharp retraction of the abdomen, immediate licking or scratching of the site of hair application, and trials of escaping or jumping were considered positive responses to abdominal stimulation.

Results

Figure 1B:
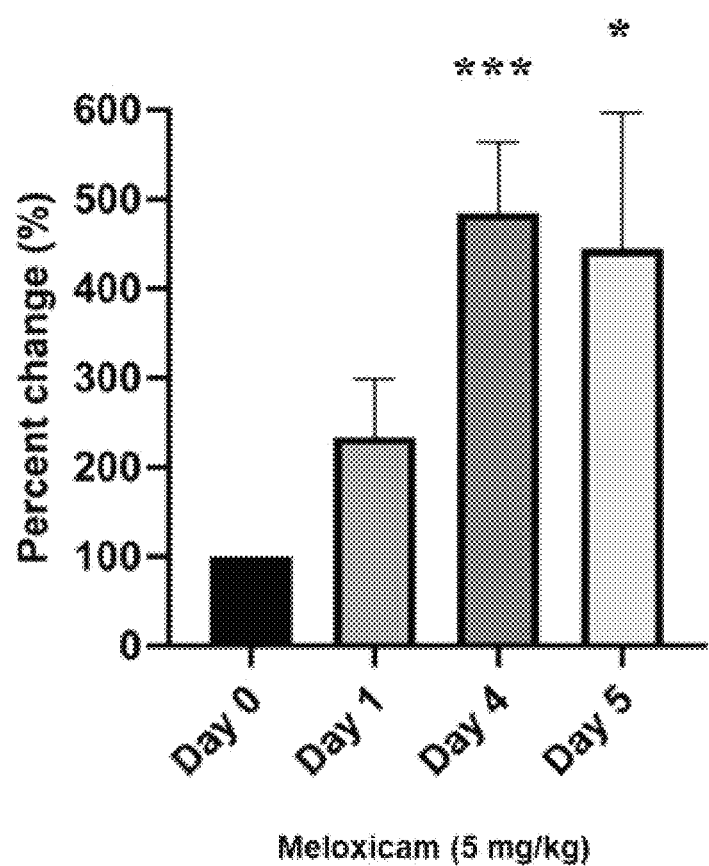
FIG. 1B depicts von Frey filament results in syngeneic C57BL/6 mice dosed with meloxicam (5 mg/kg, i.p.).

Assay results are shown in FIG. 1A and FIG. 1B. The Von Frey test is a validated method of evaluating mechanical allodynia in rodents. The increased pressure required to elicit a pain response indicates decreased pain sensitivity and can help identify potentially therapeutic agents with analgesic effect. In this example, the Von Frey test was used to measure the effect of Compound 1 on the reduction of pain sensation caused by endometriosis in a murine model. Meloxicam, a therapeutic agent known to reduce the pain caused by endometriosis and commonly used in clinical practice, served as positive control. In the Von Frey test, higher stimulus threshold indicates decreased pain perception. Results presented in FIG. 1B reveal that the positive control group, treated with meloxicam (5 mg/kg), had an increased stimulus threshold after drug treatment on both days 4 and 5 ($p=0.0002$ and $p<0.05$, respectively), demonstrating that meloxicam reduces pain perception, as expected. Similarly, a greater stimulus threshold was observed on day 4 and 5 for Compound 1 (30 mg/kg) (FIG. 1A), confirming the analgesic effect of Compound 1 as measured by the Von Frey assay ($p<0.05$). Results in FIG. 1A and FIG. 1B are shown as percent change (%), from baseline Day 0, in pressure stimulus required to elicit behavioral response.

We claim:
1. A method of treating endometriosis-associated chronic pain in a mammal in need thereof, the method comprising administering to the mammal a therapeutically effective amount of a P2X3 antagonist, wherein the P2X3 antagonist is a compound of Formula (I), or a pharmaceutically acceptable salt thereof, wherein Formula (I) is:

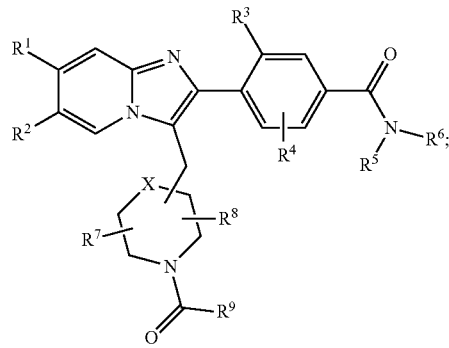

Formula (I)

R¹ is selected from the group consisting of cyano, halogen, methyl, and ethyl;

R² is selected from the group consisting of hydrogen, halogen, methyl, and ethyl;

R³ is selected from the group consisting of halogen, methyl, and ethyl;

R⁴ is selected from the group consisting of hydrogen, halogen, methyl, ethyl, and methoxy; R⁵ and R⁶ are independently selected from the group consisting of hydrogen, $C_1$-$C_6$-alkyl, and hydroxy-$C_1$-$C_6$-alkyl; or R⁵ and R⁶, together with the nitrogen to which they are both attached, form a 5- or 6-member heterocycloalkyl, wherein the heterocycloalkyl is optionally substituted with one or more substituents independently selected from the group consisting of halogen, hydroxyl, and $C_1$-$C_4$-alkyl;

R⁷ and R⁸ are independently selected from the group consisting of hydrogen and $C_1$-$C_4$-alkyl;

R⁹ is selected from the group consisting of $C_1$-$C_6$-alkyl, $C_3$-$C_6$-cycloalkyl, $C_1$-$C_6$-alkyl-$C_3$-$C_6$-cycloalkyl, halo-$C_1$-$C_6$-alkyl, $C_1$-$C_6$-alkoxy, halo-$C_1$-$C_6$-alkoxy, and $C_1$-$C_6$-alkoxy-$C_1$-$C_6$-alkyl; and X is selected from the group consisting of a bond, $CH_2$, and O.

2. The method of claim 1, wherein R¹ is methyl and R² is hydrogen.

3. The method of claim 1, wherein R³ and R⁴ are fluoro.

4. The method of claim 1, wherein X is O.

5. The method of claim 1, wherein the compound corresponds in structure to:

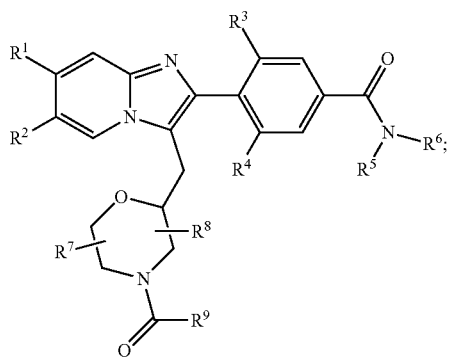

and

R⁴ is selected from the group consisting of halogen, methyl, and ethyl.

6. The method of claim 1, wherein R⁵ is hydrogen and R⁶ is $C_1$-$C_6$-alkyl.

7. The method of claim 1, wherein R⁶ is methyl.

8. The method of claim 1, wherein R⁷ and R⁸ are hydrogen.

9. The method of claim 1, wherein R⁹ is $C_1$-$C_6$-alkoxy.

10. The method of claim 1, wherein R⁹ is methoxy.

11. The method of claim 1, wherein the compound corresponds in structure to:

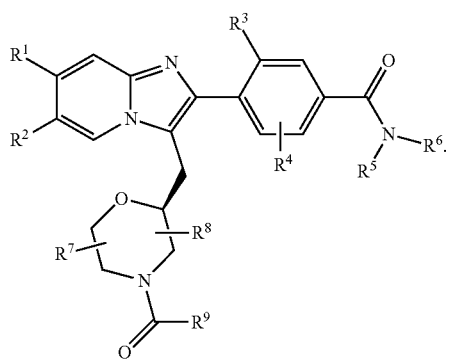

12. The method of claim 1, wherein the compound corresponds in structure to:

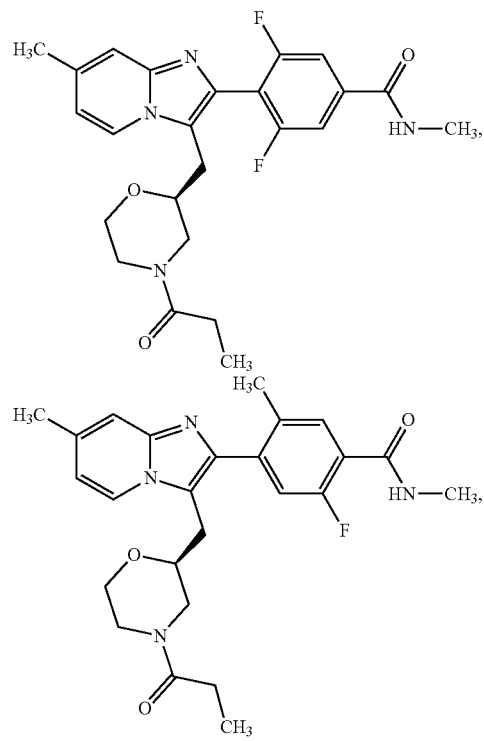

51
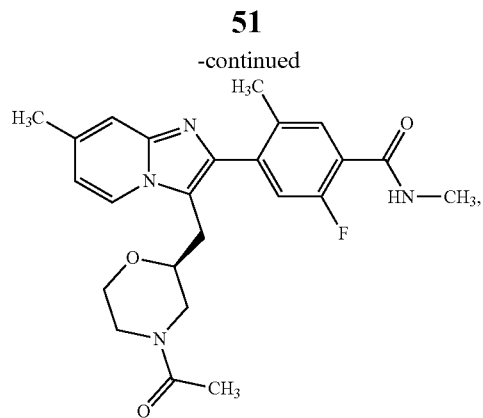
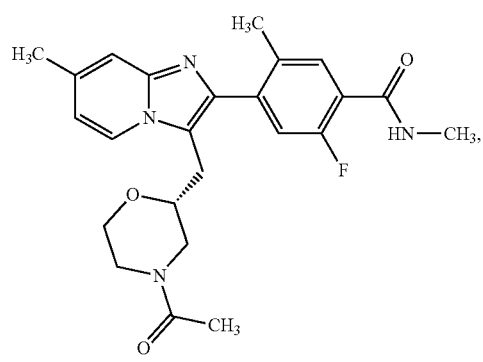
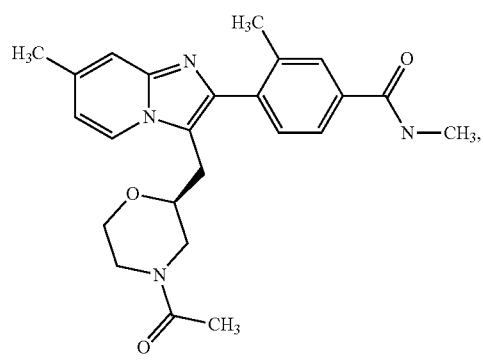
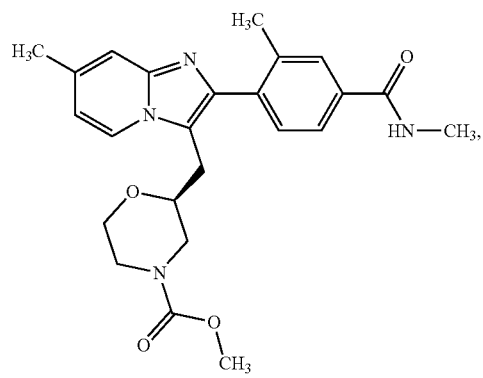
52
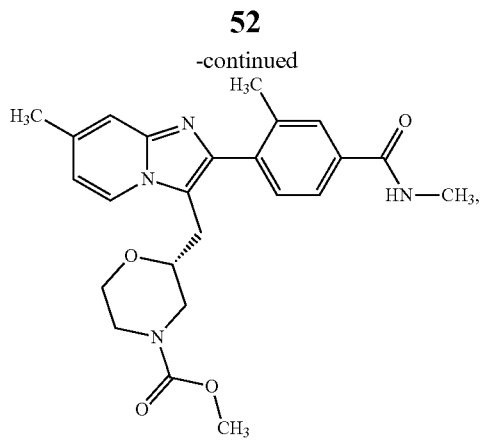
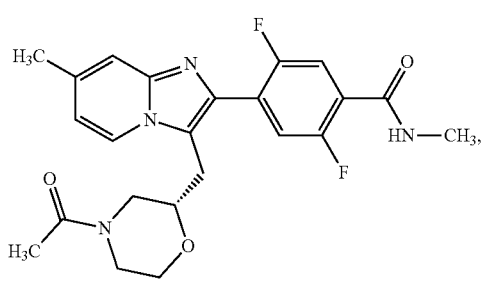
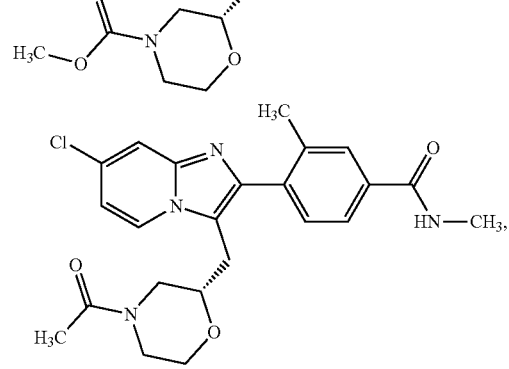
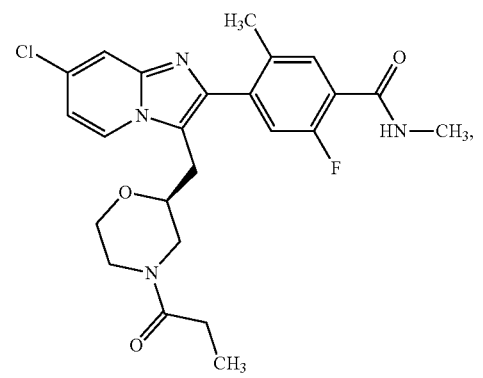

-continued
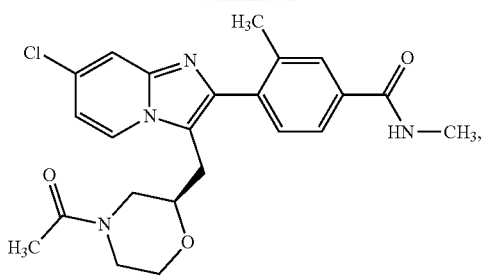
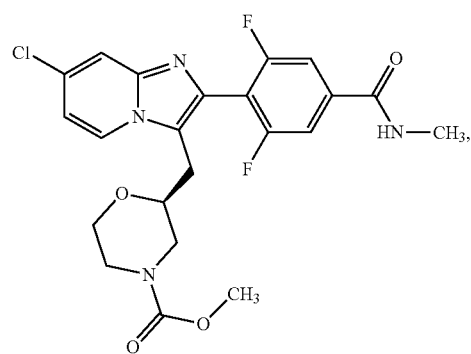
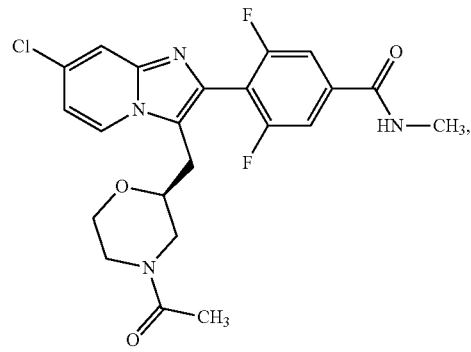
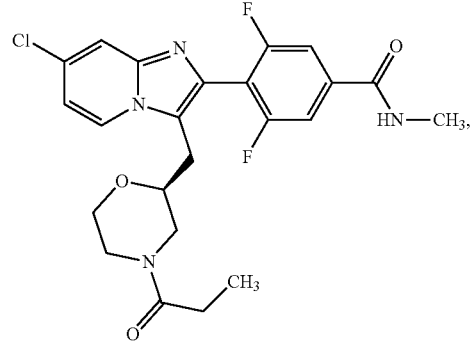
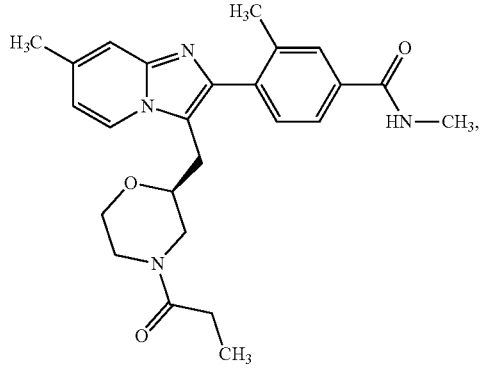
-continued
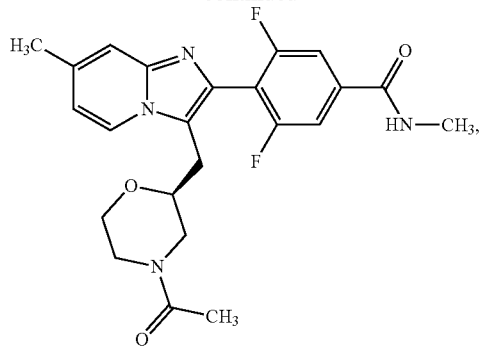
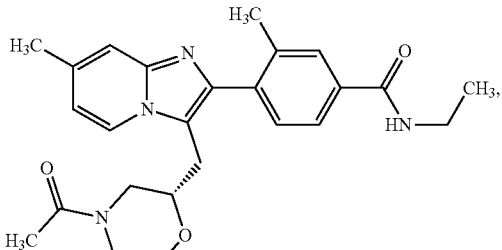
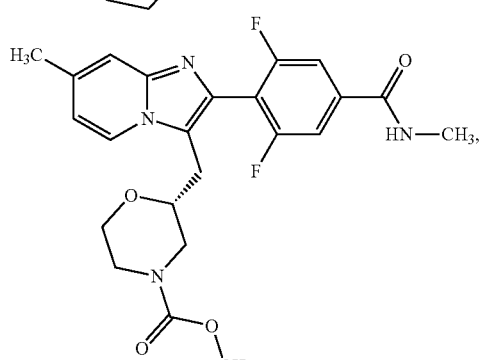
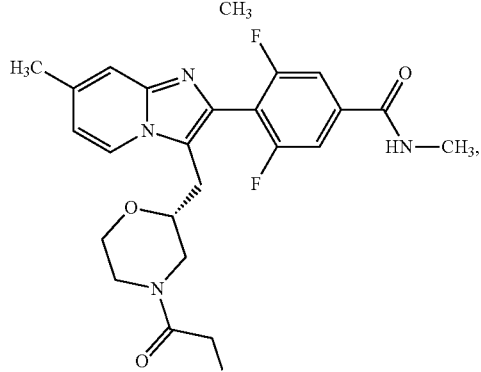
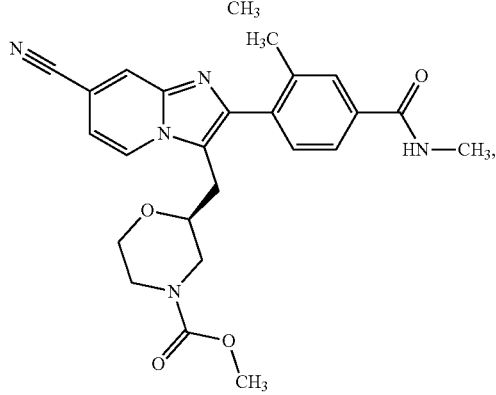

55
-continued
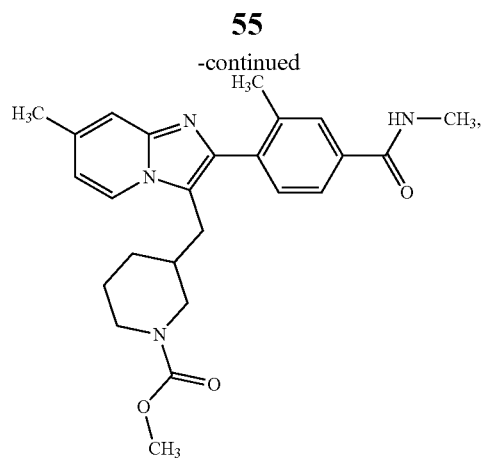
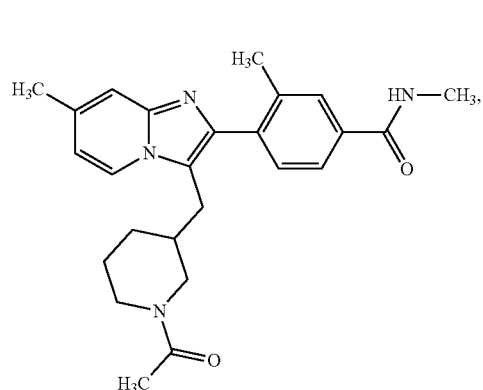
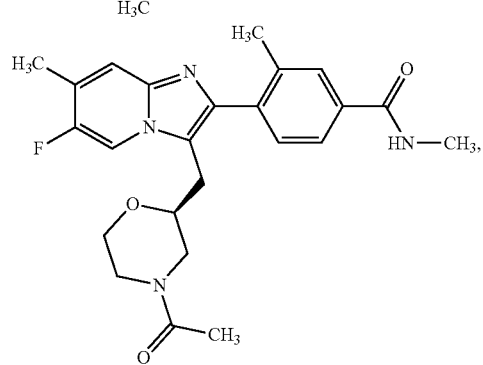
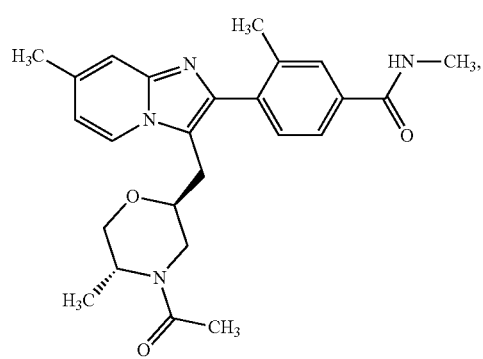
56
-continued
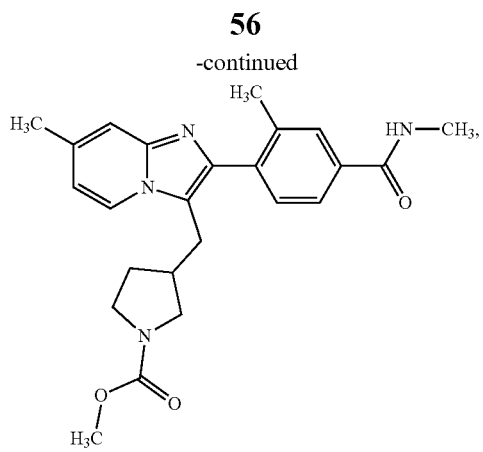
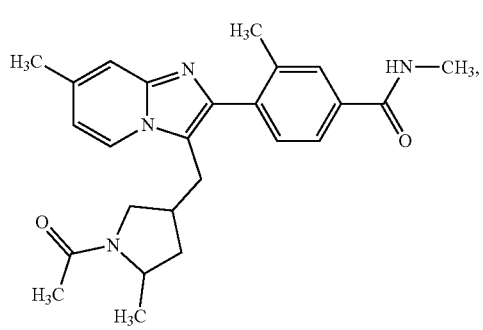
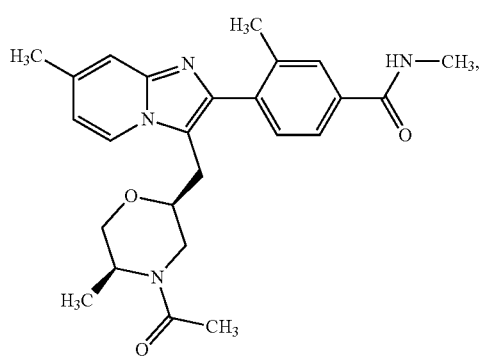
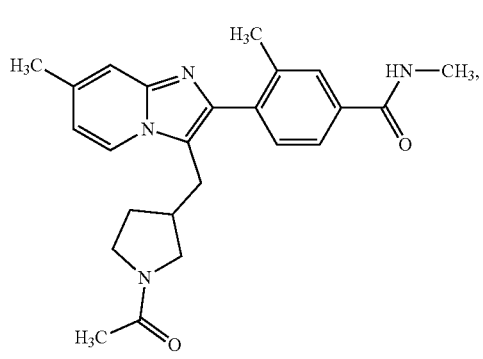

-continued

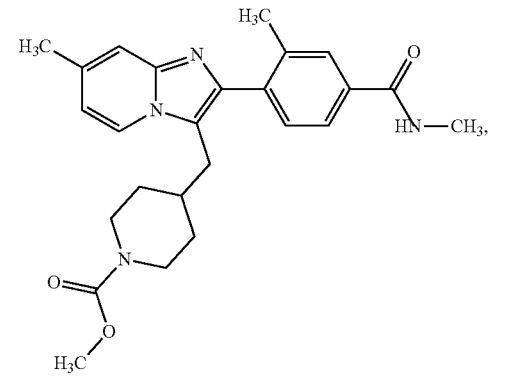

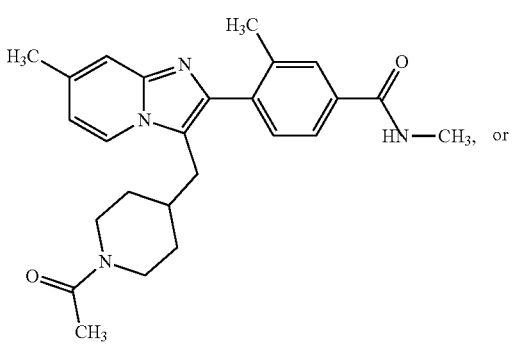

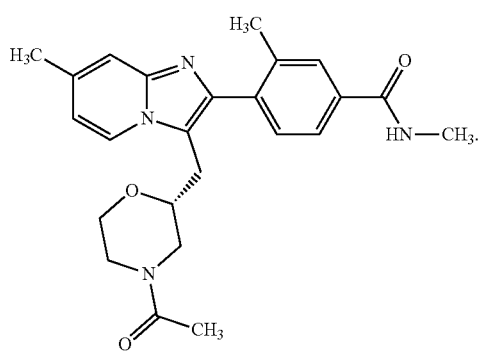

13. The method of claim 2, wherein the compound corresponds in structure to:

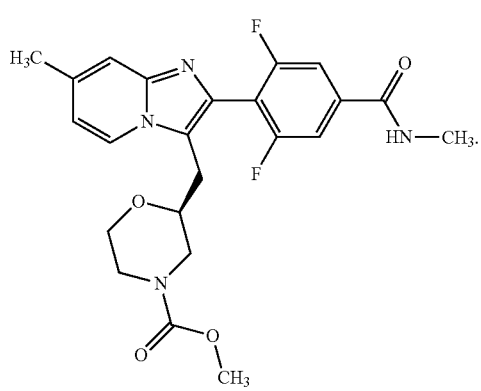 [SMILES: CNC(=O)c1cc(F)c(-c2nc3cc(C)ccn3c2C[C@H]2CN(C(=O)OC)CCO2)c(F)c1]

14. The method of claim 1, wherein the compound corresponds in structure to:

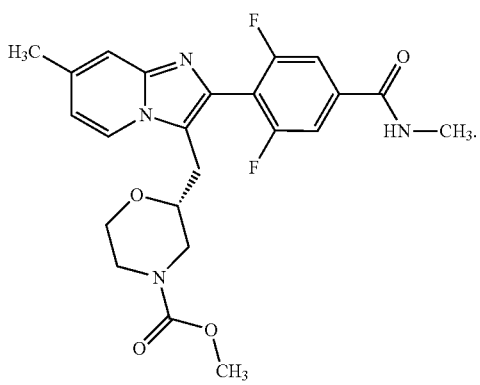 [SMILES: CNC(=O)c1cc(F)c(-c2nc3cc(C)ccn3c2C[C@@H]2CN(C(=O)OC)CCO2)c(F)c1]

15. The method of claim 1, wherein the compound corresponds in structure to:

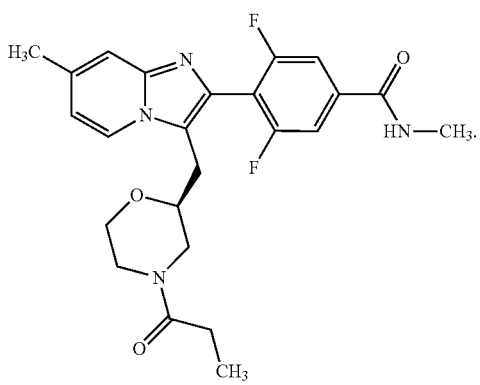 [SMILES: CCC(=O)N1CCO[C@@H](Cc2c(-c3c(F)cc(C(=O)NC)cc3F)nc3cc(C)ccn23)C1]

16. The method of claim 1, wherein the compound corresponds in structure to:

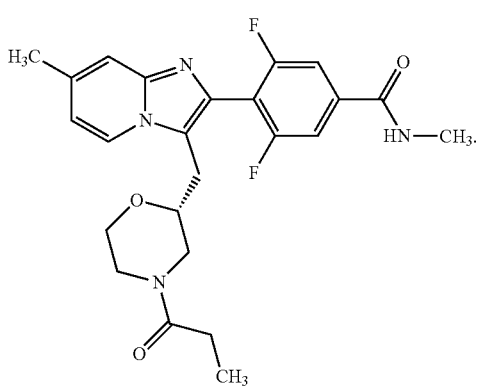

17. The method of claim 1 wherein the mammal is a human.

18. The method of claim 1, further comprising the administration of a second therapeutic agent.

19. The method of claim 18, wherein the second therapeutic agent is selected from a hormonal contraceptive, a non-steroidal anti-inflammatory agent (NSAID), a prostaglandin E synthase (PTGES) inhibitor, an interleukin-I receptor-associated kinase 4 (IRAK.4) inhibitor, a prostanoid EP4 receptor antagonist, an aldo-keto reductase 1C3 (AKRIC3) inhibitor, and a prolactin receptor (PRLR) antagonist.

\* \* \* \* \*